United States Patent [19]

Maruyama et al.

[11] Patent Number: 5,732,326
[45] Date of Patent: Mar. 24, 1998

[54] INFORMATION GUIDING SYSTEM AND METHOD OF PREVENTING BORROWER OF PORTABLE TERMINAL UNIT FROM FORGETTING TO RETURN IT

[75] Inventors: Minoru Maruyama; Kunio Watanabe; Takuro Oguchi, all of Kawasaki, Japan

[73] Assignee: Fujitsu Limited, Kanagawa, Japan

[21] Appl. No.: 529,287

[22] Filed: Sep. 15, 1995

[30] Foreign Application Priority Data

Sep. 30, 1994 [JP] Japan .................................. 6-236586
Jul. 4, 1995 [JP] Japan .................................. 7-168566

[51] Int. Cl.$^6$ ........................................... H04B 7/00
[52] U.S. Cl. ...................... 455/66; 455/412; 455/507; 455/517; 381/77; 340/825.25
[58] Field of Search .................... 455/66, 412, 422, 455/426, 462, 500, 507, 517, 526, 59, 61, 575, 103, 550, 186.1, 41; 381/77, 80; 340/825.25, 825.72, 825.71

[56] References Cited

U.S. PATENT DOCUMENTS 3,934,202  1/1976  Missale .......................... 455/66
5,152,003  9/1992  Poch ............................. 455/66
5,461,371  10/1995  Matsumoto et al. ............. 340/825.25

OTHER PUBLICATIONS

Tour-Mate, "Tour-Mate Audio Tour System", pp. 1-7.

*Primary Examiner*—Reinhard J. Eisenzopf
*Assistant Examiner*—Doris To
*Attorney, Agent, or Firm*—Helfgott & Karas, P.C.

[57] ABSTRACT

An information guiding system is composed of cordless portable terminal units which are to be carried by visitors of a museum, radio base stations, an exchange, and an audio response equipment. A portable terminal unit transmits a service number for guiding to a radio base station so as to request the radio base station to set a call to the audio response equipment, and the radio base station transmits the call setting request to the exchange, which sets a speech path to the audio response equipment in answer to the call setting request. The portable terminal unit then transmits information (the number of an exhibit, the language and the information depth) designating an audio file via the radio base station, the exchange and the speech path. The audio response equipment takes out the information about the exhibit on the basis of the information designating the audio file, converts the information into audible sound signals, transmits the audible sound signals to the speech path, and transmits the signal to the portable terminal unit which has called, via the exchange and the radio base station.

14 Claims, 32 Drawing Sheets

| HIGH FREQUENCY [Hz]<br>LOW FREQUENCY [Hz] | 1209 | 1336 | 1477 | 1633 |
|---|---|---|---|---|
| 697 | 1 | 2 | 3 | RESERVE |
| 770 | 4 | 5 | 6 | RESERVE |
| 852 | 7 | 8 | 9 | RESERVE |
| 941 | * | 0 | # | RESERVE |

INFORMATION GUIDING SYSTEM AND METHOD OF PREVENTING BORROWER OF PORTABLE TERMINAL UNIT FROM FORGETTING TO RETURN IT

BACKGROUND OF THE INVENTION

Field of the Invention

The present invention relates to an information guiding system for providing information (explanation) about the exhibits in a museum, an art museum or the like for visitors in a speech sound, and a method of preventing a borrower of a portable terminal unit from forgetting to return it. More particularly, the present invention relates to an information guiding system which is capable of explaining the exhibits to a visitor from the beginning in a speech sound and that in the language designated by the visitor and in accordance with the desired degree of detailedness of explanation (detailed explanation or schematic explanation, hereinafter referred to as "information depth"), and to a method of preventing a borrower of a portable terminal unit from forgetting to return it.

In a museum or an art museum, many visitors require explanation of the exhibits in each room. To meet such demand, an information guiding system for outputting explanation of the exhibits in a speech sound from a portable terminal unit which is lent to a visitor has been proposed.

In a first conventional information guiding system, information is provided for a terminal unit which is lent to a Visitor in a broadcast system using a feeble FM broadcast wave, infrared rays or a supersonic wave. FIG. 33 shows the structure of such a conventional information guiding system. In FIG. 33, the reference numeral 1 represents a broadcast station which holds the same number of guiding speech sounds as the number of exhibits multiplied by the number of languages, $2a$ to $2n$ exhibits, $3a$ to $3n$ transmitters provided in the vicinity of the respective exhibits so as to transmit guiding sound signals with respect to the corresponding exhibit, and $4a_1$ to $4a_m$, $4b$, ... $4n$ receivers carried by visitors. Each transmitters transmits a speech sound with respect to an exhibit in the form of FM signals, infrared rays or supersonic wave signals, and each receiver receives the signals transmitted from each transmitter, demodulates them and outputs a speech sound.

In a second conventional information guiding system, a CD player is used as a portable terminal unit. FIG. 34 shows the structure of a conventional information guiding system which uses such a portable CD player. In FIG. 34, the reference numerals $5a$ to $5n$ denote exhibits, and $6a_1$ to $6a_m$, $6b_1$, $6c_1$ to $6c_m$, $6n_1$ CD players carried by visitors. Each visitor can listen to the information about a desired exhibit from the beginning by inputting the number of the exhibit from the operating portion of the CD player.

According to the first conventional information guiding system, it is possible to use a small-sized and light-weighted portable terminal unit which is convenient for carrying. However, it is unavoidable that some visitors must listen to the explanation from the middle. In addition, according to the first conventional information guiding system, when the layout of the exhibits is changed, it is necessary to change the positions at which the transmitters are disposed and, hence, to change the wiring.

The second conventional information guiding system is advantageous in that it is possible to explain the exhibits individually to each visitor. However, the key operation for inputting the number of an exhibit is troublesome. In addition, since the portable terminal unit has a disk driving portion, it is comparatively large and heavy, so that it is inconvenient for carrying.

In addition to the above-described problems, the conventional information guiding systems suffer from the problem that borrowers may take out the portable terminal units without returning when they leave the museum. Since the portable terminal unit itself is not usable outside of the museum, it is supposed in many cases to be not that borrowers carry the portable terminal units outside of the museum so as to steal them but that they stop using the portable terminal units halfway, put them into bags or the like, and forget to return them when they leave the museum. A method of preventing a borrower of a portable terminal unit from forgetting to return it is therefore demanded.

SUMMARY OF THE INVENTION

Accordingly, it is a first object of the present invention to eliminate the above-described problems in the related art and to provide an information guiding system which is capable of reducing the size and the weight of a portable terminal unit, which does not require the positions of the transmitters to be changed when the layout of the exhibits is changed, which is capable of explaining the exhibits individually to a visitor and hence enables each visitor to listen to the explanation from the beginning, and which has a good operability.

It is a second object of the present invention to provide a method of preventing a borrower of a portable terminal unit from forgetting to return it.

To achieve the first end, in one aspect of the present invention, there is provided an information guiding system comprising: an audio response equipment for storing a multiplicity of audio files so as to provide information about the exhibits for visitors in a speech sound, taking out the information about the exhibit from the audio file designated by audio file designating information, and outputting the information in audible sound signals; a cordless portable terminal unit which is carried by a visitor; a radio base station for controlling the connection between a radio circuit for the portable terminal unit and a wire circuit for an exchange; and the exchange for controlling the connection between the radio base station and the audio response equipment; wherein the portable terminal unit transmits a service number for guiding to the radio base station so as to request the radio base station to set a call to the audio response equipment; the radio base station transmits the call setting request to the exchange through the wire circuit when the radio base station receives the call setting request; the exchange sets a speech path to the audio response equipment on the basis of the call setting request; the portable terminal unit transmits the audio file designating information to the audio response equipment via the radio base station, the exchange and the speech path; and the audio response equipment takes out the audio information with respect to the exhibit from the audio file designated by the audio file designating information, converts the audio information into audible sound signals and transmits the audible sound signals to the speech path so that it is transferred via the exchange and the radio base station to the portable terminal unit which has called the audio response equipment.

To achieve the second end, in a second aspect of the present invention, there is provided a method of preventing a borrower of a portable terminal unit from forgetting to return it comprising the steps of: disposing a specific radio base station for preventing a borrower of a portable terminal unit from forgetting to return it, in a specific place such as the vicinity of the entrance and the exit of a museum in addition to radio base stations provided in the museum; transmitting a specific radio signal from the specific radio base station; judging that a portable terminal unit has entered the specific radio zone controlled by the specific radio base station when the portable terminal unit receives the specific radio signal; and (1) operating an alarm unit provided within the portable terminal unit by the portable terminal unit when the portable terminal unit has entered the specific radio zone; or (2) transmitting a predetermined signal from the portable terminal unit to a base station controller (exchange) via the specific radio base station when the portable terminal unit has entered the specific radio zone; and taking measures to prevent the borrower of the portable terminal unit from forgetting to return it by the base station controller when the base station controller receives the predetermined signal.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Schematic explanation of the invention (a) Schematic explanation of an information guiding system In FIG. 1, the reference numeral 11a represents an exhibit, 12a a feeble signal transmitter which is disposed in the vicinity of each exhibit so as to transmit the number of the corresponding exhibit through a feeble signal, 13a to 13m cordless portable terminal units carried by visitors, 14a a radio base station for controlling the connection between a radio circuit for a portable terminal unit and a wire circuit for an exchange, 15 the exchange for controlling the connection between the radio base station 14a and an audio response equipment, and 21 the audio response equipment which stores a multiplicity of audio files SFij and takes out the audio information with respect to the exhibits from the audio file designated by the audio file designating information, so as to provide the information about the exhibits for visitors in a speech sound.

Figure 1:
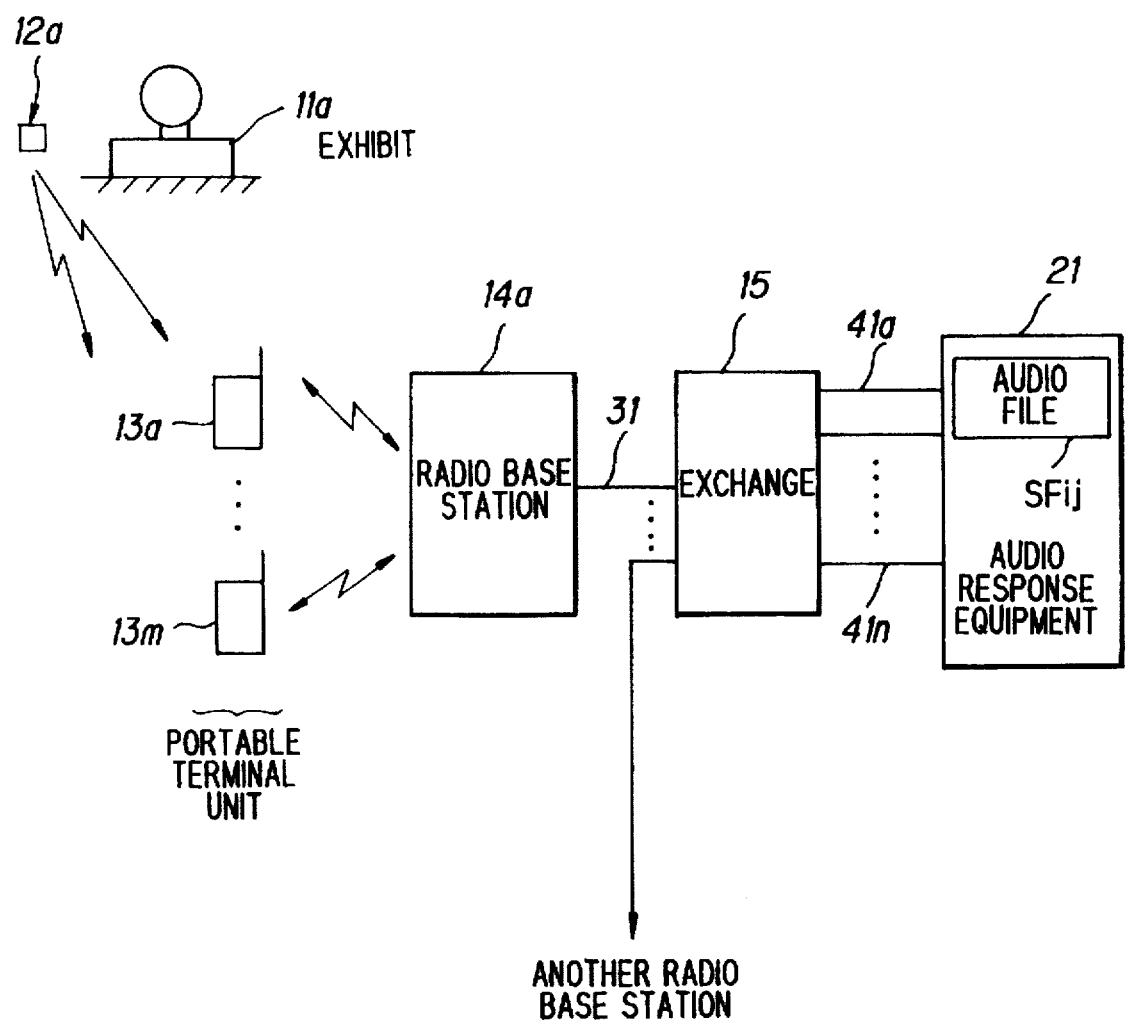
FIG. 1 is a schematic explanatory view of an information guiding system according to the present invention.

The portable terminal unit 13a transmits the service number for guiding to the radio base station 14a through a control channel (control circuit) so as to request the radio base station 14a to set a call to the audio response equipment 21, and the radio base station 14a transmits the call setting request to the exchange 15 through a wire circuit 31 when the radio base station 14a receives the call setting request to the audio response equipment 21 from the portable terminal unit 13a. The exchange 15 sets a speech path 41a to the audio response equipment 21 in answer to the call setting request. The portable terminal unit 13a then transmits the audio file designating information (the number of an exhibit, the language, the information depth) to the audio response equipment 21 via the radio base station 14a, the exchange 15 and the speech path 41a. The audio response equipment 21 takes out the information with respect to the exhibit 11a from the audio file SFij designated by the audio file designating information, converts the information into audible sound signals and transmits the audible sound signals to the speech path 41a via the exchange 15 and the radio base station 14a so as to transmit the audible sound signals to the portable terminal unit 13a which has called the audio response equipment 21. In this manner, since the communication line is established individually for each portable terminal unit, each visitor can individually listen to the information about an exhibit from the beginning. In addition, it is possible to reduce the size and the weight of the portable terminal unit so as to be convenient for carrying.

The portable terminal unit 13a receives the feeble signal transmitted from the feeble signal transmitter 12a, identifies the individual number of the exhibit, and transmits the individual number of the exhibit to the audio response equipment 21 as the audio file designating information. In this manner, since there is no need to input the number for identifying each exhibit through a key, the visitor can automatically listen to the explanation of the desired exhibit merely by starting the portable terminal unit, which enhances the operability. In this case, if the feeble signal transmitter 12a can transmit a feeble signal intermittently, it is possible to reduce the power consumed by the feeble signal transmitter 12a.

The audio response equipment 21 is also provided with (1) audio files in a plurality of languages for each exhibit, (2) a plurality of audio files corresponding to the respective information depths (degree of detailedness such as detailed explanation and schematic explanation) for each exhibit, or (3) a plurality of audio files in a plurality of languages corresponding to the respective information depths for each exhibit. The portable terminal unit 13a transmits (1) the number of the exhibit and the selected language, (2) the number of the exhibit and the selected information depth, or (3) the number of the exhibit, the selected language and the selected information depth to the audio response equipment 21 as the audio file designating information, and the audio response equipment 21 reads the audio information from the audio file which corresponds to the audio file designating information, converts the audio information into audible sound signals, and transmits the audible sound signals to the speech path 41a and then to the portable terminal unit 13a via the exchange 15 and the radio base station 14a. In this manner, it is conveniently possible to listen to the explanation of the exhibit in a desired language with a desired degree of detailedness.

The portable terminal unit 13a is also provided with function keys which start call processing, call setting processing for transmitting a service number, processing of receiving the feeble signal transmitted from the feeble signal transmitter 12a, and processing of transmitting the audio file designating information by one-touch operation. In this manner, it is possible to receive the explanation of an exhibit merely by operating a function key, thereby enhancing the operability. When a function key is operated while the borrower is listening to the explanation of the exhibit, only the processing of receiving the feeble signal and the processing of transmitting the audio file designating information are executed and the call processing and the call setting processing for transmitting a service number are not executed. In this manner, it is possible to listen to another piece of audio information consecutively through the established communication line without cutting the communication line.

Figure 2:
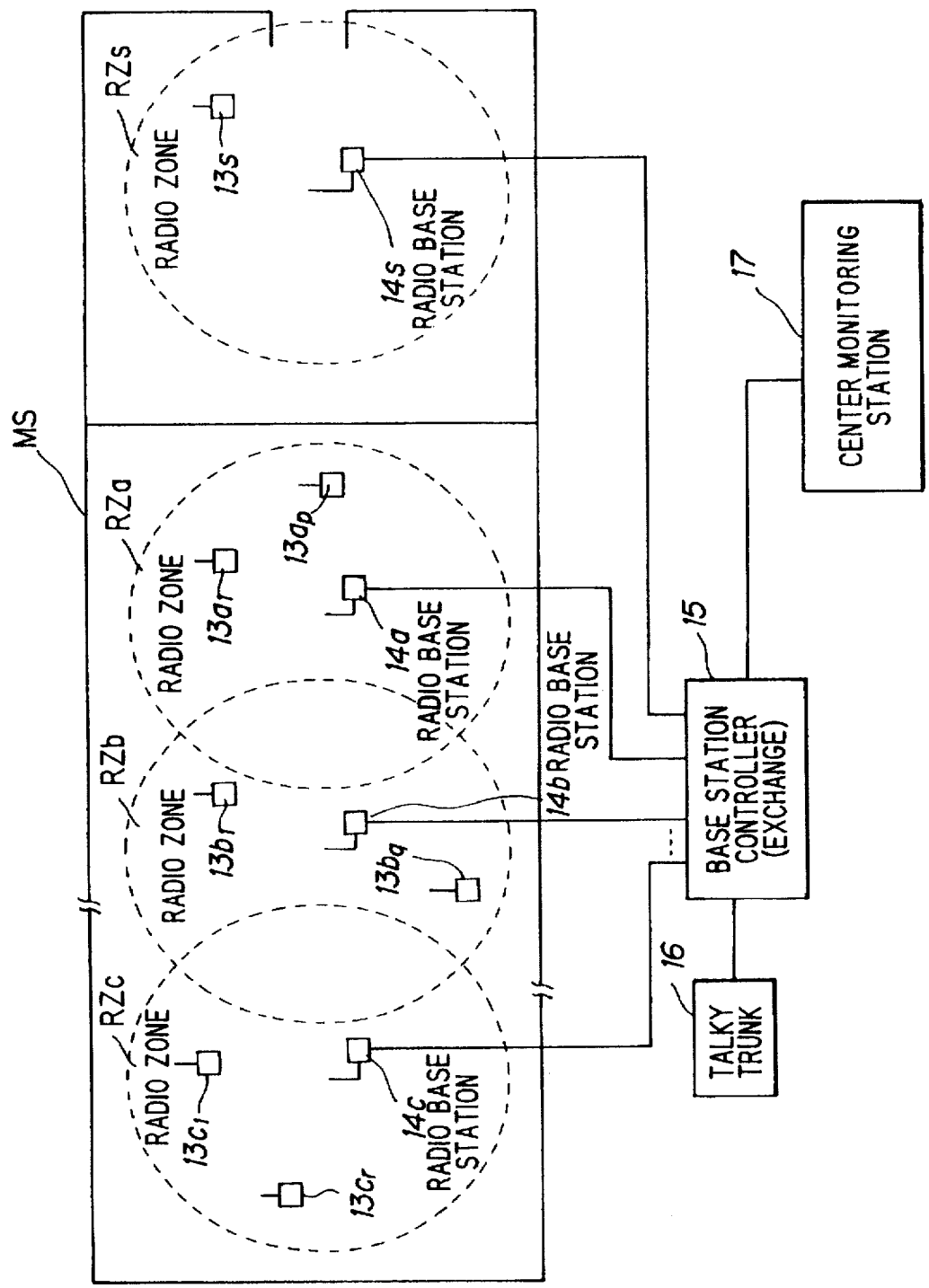
FIG. 2 is a schematic explanatory view of an embodiment of a method of preventing a borrower of a portable terminal unit from forgetting to return it according to the present invention.

(b) Schematic explanation of a method of preventing a borrower of a portable terminal unit from forgetting to return it FIG. 2 is a schematic explanatory view of a method of preventing a borrower of a portable terminal unit from forgetting to return it according to the present invention. In FIG. 2, the reference numerals $13a_1$ to $13a_p$, $13b_1$ to $13b_q$, $13c_1$ to $13c_r$, and 13s represent cordless portable terminal units carried by borrower, 14a to 14c and 14s a plurality of radio base stations for supplying and receiving radio signals to and from the portable terminal units. The radio base station 14s is disposed in a special place such as the vicinity of the entrance and the exit of a museum or art museum (hereinafter referred to simply as "museum") MS, and the other radio base stations 14a to 14c are disposed within the museum. The reference numeral 15 represents an exchange (base station controller) for controlling the radio base stations, 16 a talky trunk for outputting a message which prevents a borrower of a portable terminal unit from forgetting to return it, and 17 a center monitoring station which notifies that the a portable terminal unit has been carried out of the museum by sounding an alarm and displays the number of the portable terminal unit. The symbols RZa to RZs represent radio zones (radio wave propagation ranges) of the respective radio base stations 14a to 14s.

(b-1) First method of preventing a borrower of a portable terminal unit from returning it A specific radio base station 14s for preventing a borrower of a portable terminal unit from returning it is disposed in a special place such as the entrance and the exit of the museum MS, and a specific radio signal is transmitted from the radio base station 14s. Each portable terminal unit detects that it has entered the radio zone RZs which is controlled by the radio base station 14s when the portable terminal unit receives the specific radio signal. The portable terminal unit 13s existing in the radio zone RZs supplies a signal which indicates that the portable terminal unit 13s has entered the radio zone RZs to the base station controller 15 via the radio base station 14s, and the base station controller 15 takes measures to prevent the borrower from forgetting to return the portable terminal unit 13s on the basis of the received signal.

For example, the radio base station 14s supplies, as the radio signal, position information which is different from the position information supplied from the other radio base stations 14a to 14c within the museum. Each portable terminal unit stores the latest position information received from a predetermined radio base station, and compares the stored position information with the position information which is newly received from the predetermined radio base station. If the former is different form the latter, the portable terminal unit supplies a position registering request signal to the base station controller 15 via the specific radio base station 14s. Therefore, when the portable terminal unit 13s is carried out of the museum and enters the radio zone RZs, the portable terminal unit 13s supplies a position registering request signal to the specific radio base station 14s.

When the base station controller 15 receives the signal indicating that the portable terminal unit 13s has entered the specific radio zone RZs, the base station controller 15 radio base station calls the portable terminal unit 13s and transmits a message for preventing a borrower of a portable terminal unit from returning it from the talky trunk 16. The portable terminal unit 13s receives the message and outputs it in a speech sound. In addition, the base station controller 15 informs the center monitoring station 17 that the portable terminal unit 13s has been carried out of the museum.

(b-2) Second method of preventing a borrower of a portable terminal unit from returning it A specific radio base station 14s for preventing a borrower of a portable terminal unit from returning it is disposed in a special place such as the entrance and the exit of the museum MS, and a specific radio signal is transmitted from the radio base station 14s. Each portable terminal unit detects that it has entered the radio zone RZs which is controlled by the radio base station 14s when the portable terminal unit receives the specific radio signal. If the portable terminal unit 13s detects that it has entered the radio zone RZs, the portable terminal unit 13s operates an alarm unit provided within the portable terminal unit 13s so as to prevent the borrower from forgetting to return the portable terminal unit 13s. For example, the specific radio base station 14s transmits an identification code which is different from the identification codes supplied from the other radio base stations 14a to 14c provided within the museum. Each portable terminal unit stores the identification code to be transmitted from the specific radio base station 14s in the memory in advance, and compares the stored identification code with the received identification code. If these codes are coincident, the portable terminal unit judges that it has entered the specific radio zone RZs, and operates the alarm unit.

(b-3) Third method of preventing a borrower of a portable terminal unit from returning it A specific radio base station 14s for preventing a borrower of a portable terminal unit from returning it is disposed in a special place such as the entrance and the exit of the museum MS, and a specific radio signal is transmitted from the radio base station 14s. The base station controller 15 monitors the state of each portable terminal unit so as to judge whether or not it is busy, and calls the portable terminal unit 13s with a ring which is not busy via the specific radio base station 14s. When the portable terminal unit 13s which is called returns an off-hook response, the base station controller 15 connects the portable terminal unit 13s with the talky trunk 16 and transmits the message for preventing a borrower of a portable terminal unit from returning it to the portable terminal unit 13s. The portable terminal unit 13s outputs the received message in a speech sound. On the other hand, when the portable terminal unit 13s which is called returns a call-incoming response, the base station controller 15 notifies the center monitoring station 17 that the portable terminal unit 13s has been carried out of the museum.

(b-4) Fourth method of preventing a borrower of a portable terminal unit from returning it A specific radio base station 14s for preventing a borrower of a portable terminal unit from returning it is disposed in a special place such as the entrance and the exit of the museum MS. The base station controller 15 monitors each portable terminal unit to judge whether or not it is busy, and the specific radio base station 14 refers to the base station controller 15 for the busy state of each portable terminal unit, and calls the portable terminal unit with a ring which is not busy.

(b-5) Fifth method of preventing a borrower of a portable terminal unit from returning it A specific radio base station 14s for preventing a borrower of a portable terminal unit from returning it is disposed in a special place such as the entrance and the exit of the museum MS. The base station controller 15 calls all the portable terminal units $13a_1$ to $13a_p$, $13b_1$ to $13b_q$, $13c_1$ to $13c_r$, ... 13s with a ring via the specific radio base station 14s. When the portable terminal unit 13s which is called returns an off-hook response, the base station controller, 15 connects the portable terminal unit 13s with the talky trunk 16 and transmits the message for preventing a borrower of a portable terminal unit from returning it to the portable terminal unit 13s. The portable terminal unit 13s outputs the received message in a speech sound.

Figure 3:
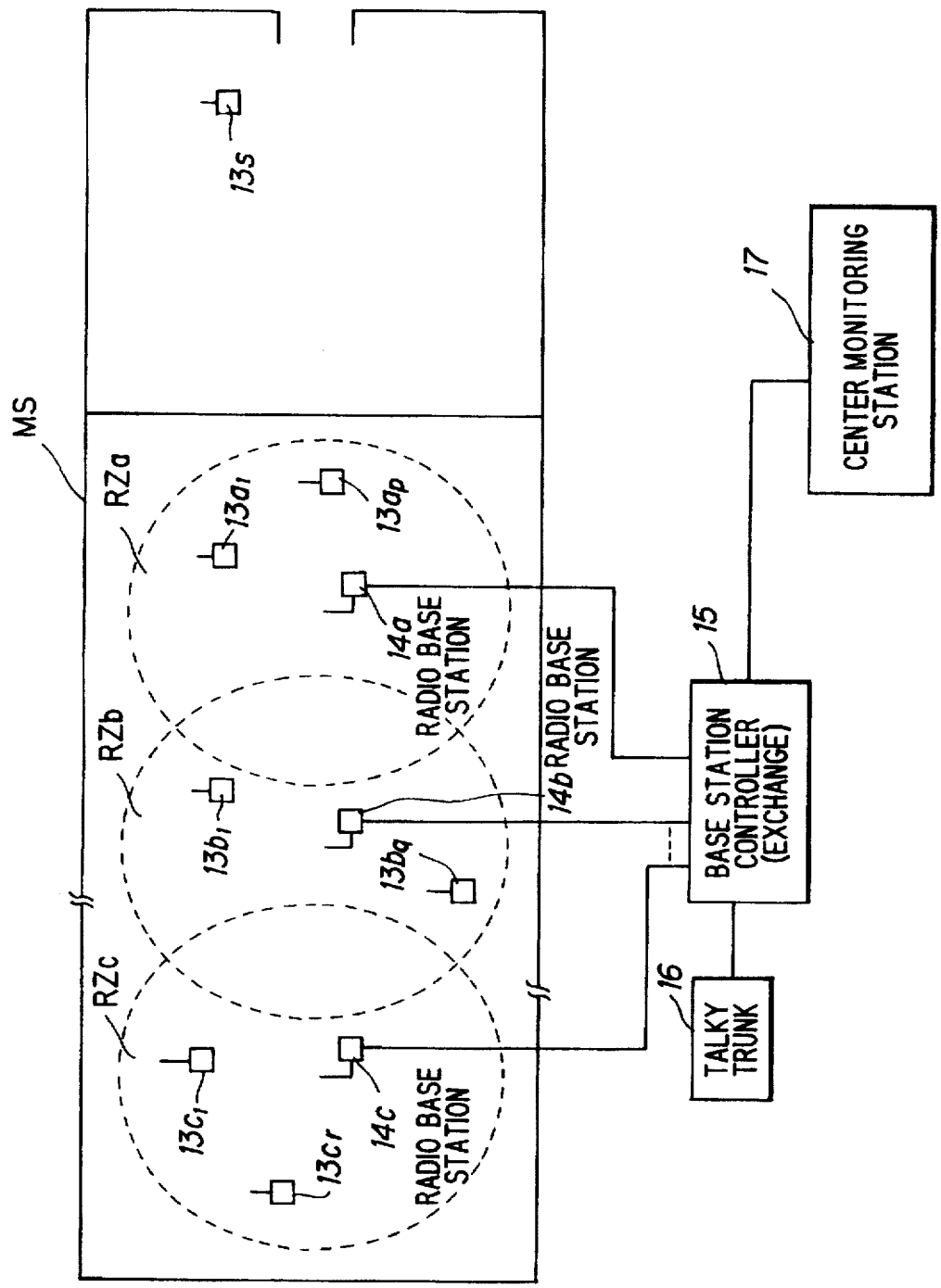
FIG. 3 is a schematic explanatory view of another embodiment of a method of preventing a borrower of a portable terminal unit from forgetting to return it according to the present invention.

(b-6) Sixth method of preventing a borrower of a portable terminal unit from returning it FIG. 3 is a schematic explanatory view of another method of preventing a borrower of a portable terminal unit from returning it according to the present invention. This method is different from that shown in FIG. 2 in that the specific radio base station 14s does not exist in the vicinity of the entrance or the exit of the museum MS.

Each portable terminal unit judges whether or not a signal is transmitted from any of the radio base stations 14a to 14s. A portable terminal unit (portable terminal unit 13s in FIG. 3) which does not receive a signal from any radio base station operates an alarm unit to sound an alarm for preventing a borrower of a portable terminal unit from returning it. The base station controller 15 monitors each portable terminal unit to judge whether or not it is busy, and simultaneously calls the portable terminal unit 13s without ringing which is not busy via all the radio base stations 14a to 14c. If there is no call-incoming response from the portable terminal unit 13s, the base station controller 15 judges that the portable terminal unit 13s exists outside of all the radio zones RZa, RZb and RZc, and notifies the center monitoring station 17 that the portable terminal unit 13s has been carried out of the museum.

(B) Embodiment of an information guiding system (a) Entire structure

Figure 4:
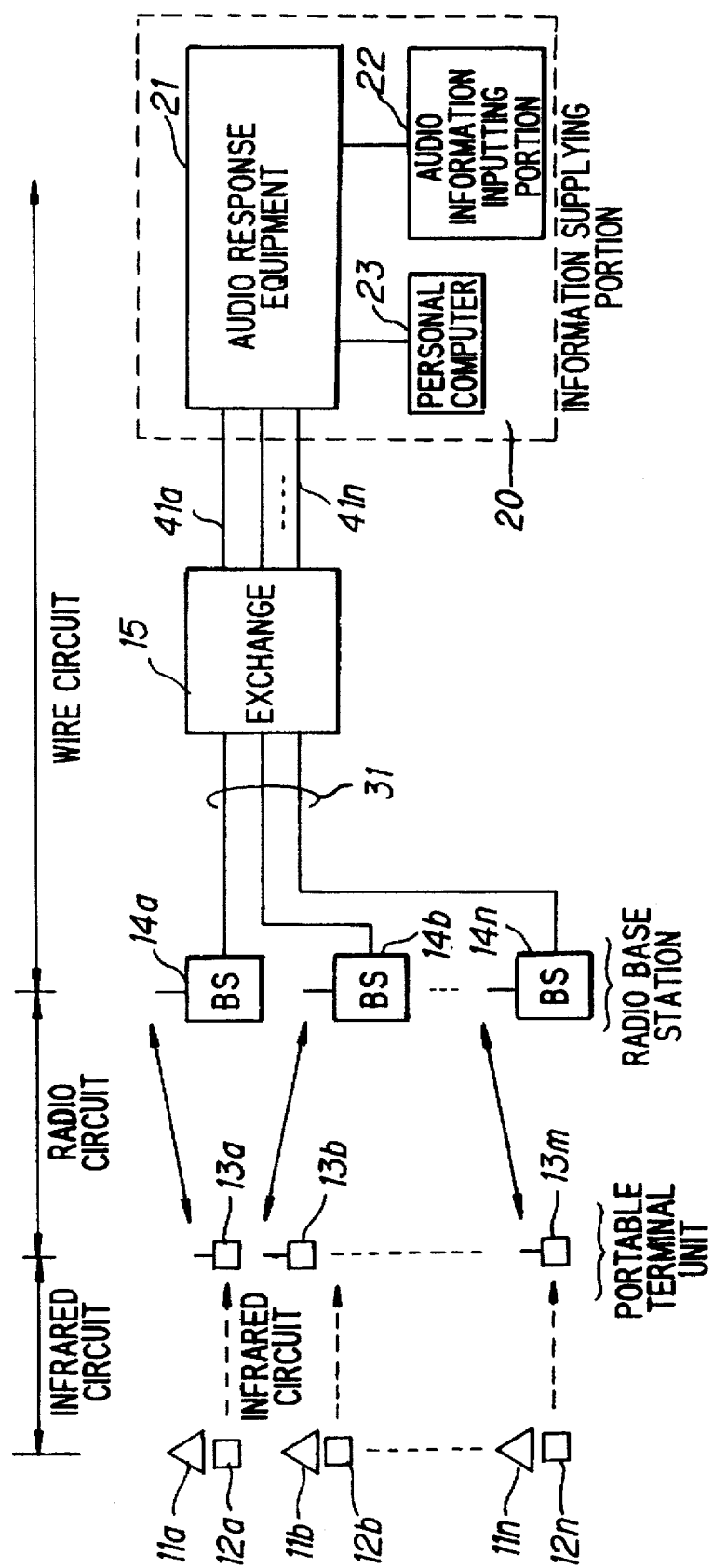
FIG. 4 shows the structure of an embodiment of an information guiding system according to the present invention.

FIG. 4 shows the entire structure of an information guiding system.

In FIG. 4, the reference numerals 11a to 11n represent exhibits, 12a to 12n feeble signal transmitters (e.g., infrared transmitters) which are disposed in the vicinity of the respective exhibits so as to transmit the numbers of the exhibits through feeble signals (infrared signals), 13a to 13m cordless portable terminal units carried by borrowers, 14a a radio base station for controlling the connection between a radio circuit for a portable terminal unit and a wire circuit for an exchange, 15 the exchange (base station controller) for controlling the connection between the radio base stations 14a to 14n and an audio response equipment, 20 an information supplying portion, 21 the audio response equipment which stores a multiplicity of audio files in an audio memory (not shown) and takes out the audio information with respect to the exhibits from the audio file designated by the audio file designating information, so as to provide the information about the exhibits for visitors in a speech sound, 22 an audio information inputting portion for inputting audio information to the audio response equipment 21, and 23 a personal computer for controlling the inputting, reloading, addition or the like of the audio information. The feeble signal transmitters (infrared transmitters) 12a to 12n transmit feeble signals (infrared signals) intermittently so as to reduce the power consumed by the feeble signal transmitters 12a to 12n.

The relationship between each of the portable terminal units 13a to 13m and each of the radio base stations 14a to 14n is similar to the relationship between an ordinary portable telephone terminal unit and a radio base station, and the communication protocol is similar. At the time of calling, a portable terminal unit, e.g., the portable terminal unit 13a transmits a calling signal to the radio base station 14a via a control channel (control circuit). When the radio base station 14a receives the calling signal, the radio base station 14a designates a predetermined time slot on a predetermined carrier (establishment of a communication channel) and informs the portable terminal unit 13 of the designated time slot. After the portable terminal unit 13a and the radio base station 14a supply and receive a synchronizing burst signal to and from each other so as to establish synchronism, the portable terminal unit 13a transmits a dial number of the called party (actually a predetermined service number 1XY for calling the audio response equipment 21) to the radio base station 14a. The radio base station 14a transmits the received service number to the exchange 15, and the exchange 15 judges the call to be a call to the audio response equipment 21 from the service number, selects a vacant line 41a to the audio response equipment 21 and sets a speech path.

Thereafter, the portable terminal unit 13a transmits the audio file designating information (the number of the exhibit, the language, the information depth) to the audio response equipment 21 via the communication line (radio circuit, speech path) which is set in the above-described way, and the audio response equipment 21 takes out the audio information with respect to the exhibit from the audio file designated by the audio file designating information, converts the audio information into audible sound signals and transmits the audible sound signals to the portable terminal unit 13a through the communication line.

(b) Portable terminal unit
(b-1) Structure

Figure 5:
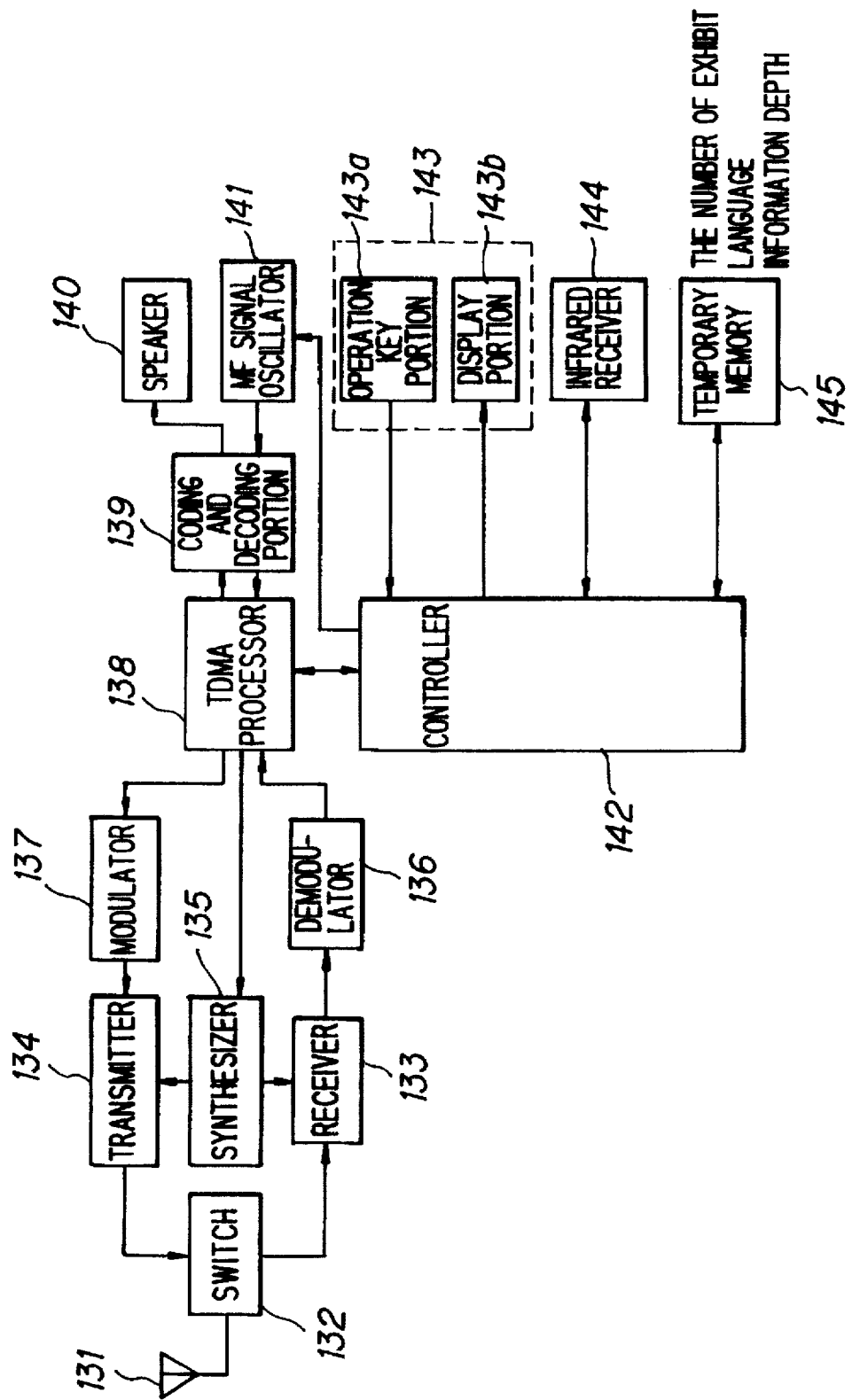
FIG. 5 shows the structure of a portable terminal unit.

FIG. 5 shows the structure of a portable terminal unit. In FIG. 5, the reference numeral 131 denotes an antenna, 132 a switch (duplexer) for appropriately connecting the antenna 131 to a receiver 133 or a transmitter 134 by switching, 135 a synthesizer for outputting a predetermined frequency signal in correspondence with the control channel or the communication channel, 136 a demodulator for demodulating digital data, 137 a modulator for modulating digital data, 138 a TDMA processor for extracting and outputting data (control data, PCM audio data) from a predetermined time slot at the time of reception and supplying data by inserting it into a predetermined slot at the time of transmission.

The reference numeral 139 denotes a coding and decoding portion for converting received PCM audio data into analog data and converting a received PB signal (MF signal) to a digital signal, 140 a speaker (or earphone), 141 an MF signal oscillator for transmitting numerals 0 to 9 and marks * and # by a combination of two frequency signals, 142 a controller for controlling a portable terminal unit as a whole, 143 an operating portion provided with an operation key portion 143a and a display portion 143b, 144 an infrared receiver for receiving the infrared signal (the number of an exhibit) supplied from an infrared transmitter and inputting it to the controller 142, and 145 a temporary memory for temporarily storing the number of an exhibit, a selected language, a selected information depth, etc.).

Figures 6, 7:
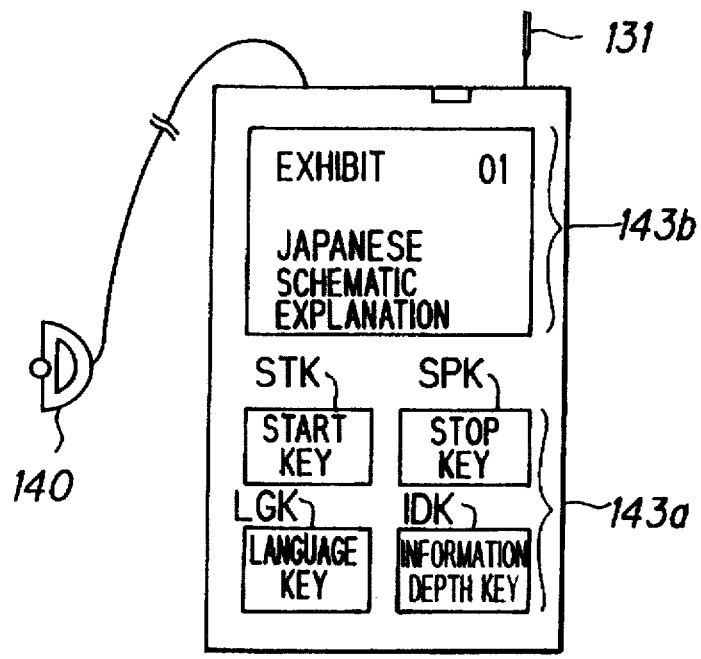
FIG. 6 is an external view of the portable terminal unit shown in FIG. 5.
FIG. 7 is an explanatory view of an MF signal.

FIG. 6 is an external view of a portable terminal unit. In FIG. 6, the reference numeral 131 represents an antenna, 140 an earphone, 143a an operation key portion, and 143b a display portion such as an LCD. As operation keys are provided a start key STK for starting the portable terminal unit, a stop key for stopping the operation of the portable terminal unit, a language key LGK for selecting the language for the explanation of the exhibits, and an information depth key IDK for selecting the degree of detailedness of explanation of the exhibits (detailed explanation or schematic explanation). Every time the language key LGK is pressed down, the language to be selected changes in the order of, for example, Japanese, English, French, German, Spanish, Chinese and Japanese, so that it is possible to select a desired language by pressing down the language key LGK. Every time the information depth key IDK is pressed down, the information depth changes in the order of, for example, detailed explanation, schematic explanation and detailed explanation.

When the start key STK is pressed down, the controller 142 executes (1) calling processing, (2) service number dialing processing (call setting processing), (3) processing for receiving an infrared signal transmitted from an infrared transmitter, and (4) processing of transmitting the information for designating an audio file. In other words, one-touch operation of the start key STK enables the carrier to listen to the explanation of an exhibit. When the start key STK is pressed down while the carrier is listening to the explanation of an exhibit, the controller 142 executes only (1) the processing of receiving an infrared signal transmitted from an infrared transmitter, and (4) the processing of transmitting the information for designating an audio file, and does not execute the calling processing or the service number dialling processing (call setting processing). In this way, it is possible to listen to another piece of audio information consecutively through the established communication line without the need for cutting the communication line.

(b-2) MF signal

FIG. 7 is an explanatory view of an MF signal (Multifrequency) signal as an audible sound signal. The MF oscillator 141 transmits numerals 0 to 9 and marks * and # by a combination of a low frequency and a high frequency. For example, the numeral 1 is transmitted by a combination of a low frequency of 697 Hz and a high frequency of 1209 Hz.

(b-3) Function of the controller

When the start key STK is pressed down, the controller 142 executes (1) the calling processing, (2) the service number dialing processing (call setting processing), (3) the processing of receiving an infrared signal (the number of an exhibit) transmitted from an infrared transmitter, and (4) the processing of transmitting the information (the number of the exhibit, the language, the information depth) for designating an audio file, as described above. The controller 142 so controls the MF oscillator 141 as to supply information for designating an audio file in the processing (4) in the form of an MF signal.

When the start key STK is pressed down during the communication with the audio response equipment 21, the controller 142 executes only (1) the processing of receiving an infrared signal (the number of an exhibit) transmitted from an infrared transmitter, and (4) the process of transmitting the information (the number of the exhibit, the language, the information depth) for designating an audio file and does not execute the calling process or the service number dialling process.

The controller 142 also stores the latest number of an exhibit, the selected language and the selected information depth in the memory 145. When the information guiding system is started by pressing down the start key STK, the controller 142 so controls the MF oscillator 141 as to transmit the selected language and the selected information depth stored in the memory 145 and the number of an exhibit received from an infrared transmitter to the audio response equipment 21 in the form of MF signals.

(c) Audio response equipment
(c-1) Entire structure

Figure 8:
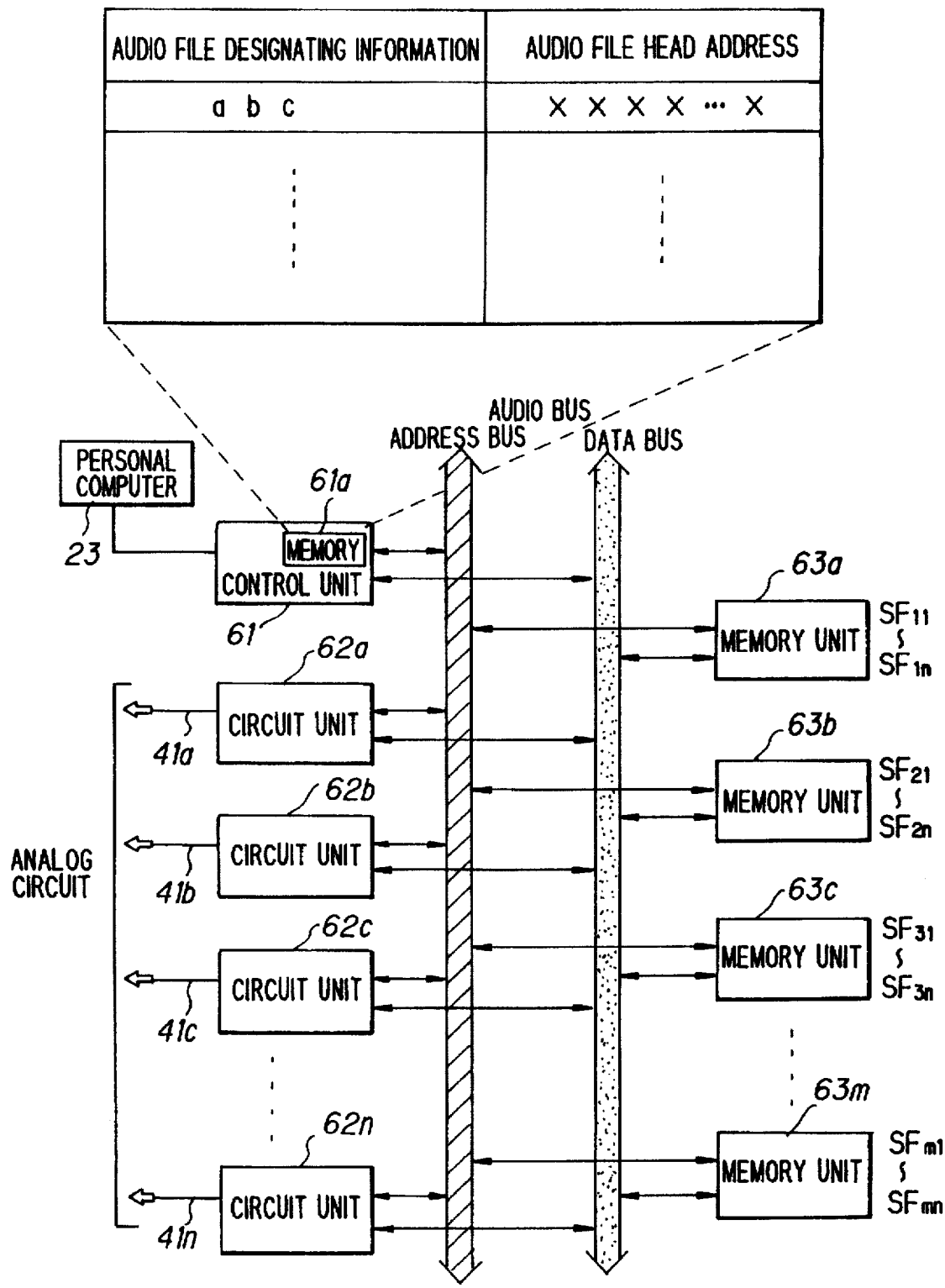
FIG. 8 shows the structure of an audio response equipment.

FIG. 8 shows the structure of the audio response equipment 21. The audio response equipment 21 is connected to the exchange 15 through n analog lines (speech paths) 41a to 41n. The audio response equipment 21 is provided with a control unit (CPU) 61, circuit units 62a to 62n provided in correspondence with the respective analog lines 41a to 41n, and a plurality of memory units 63a to 63m. These units are connected to each other through a bus. Each of the circuit units 62a to 62n has a CPU which is connected to the bus so as to directly access to each memory unit and read audio information therefrom. In other words, the audio response equipment 21 has a multiprocessor structure in which a multiplicity of CPUs are connected to a bus.

The personal computer 23 is connected to the control unit 61 via, for example, an RS232c interface so as to supply and receive data.

Each of the memory units 63a to 63m stores audio files SF11 to SFmn in a plurality of languages per exhibit and per information depth. Each audio file sample is composed of audio information (digital audio data) produced by sampling audio signals (audio explanation of an exhibit) at 8 KHz, and converting the audio signal into digital data of, for example, 8 bits per sampling.

The memory 61a of the control unit 61 stores the head address of each audio file in correspondence with audio file designating information (combination of the number a of an exhibit, a selected language b and a selected information depth c). When audio files are stored in the memory units 63a to 63m discontinuously, the memory 61a also stores a directory which shows the head address and the subsequent memory address of each audio file in correspondence with the audio file designating information.

When a circuit unit (61a to 62) receives audio file designating information (combination of the number a of an exhibit, a selected language b and a selected information depth c), it refers to the control unit 61 for the head address of the audio file designated by the audio file designating information abc, reads audio information at the designated head address, converts the digital information into analog information and outputs the analog information to the corresponding speech path.

If digital audio data of 8 bits is read from a memory unit (63a to 63m) at 8 KHz (125 µs period), converted into analog data and transmitted, it is possible to listen to the explanation of an exhibit with the same quality as a speech sound on a telephone line. If it is assumed that the circuit units 62a to 62n read 8-bit data from the memory units 63a to 63m at 2 µs, it is possible to provide about 60 circuit units (speech paths) by allotting a bus to each of the circuit units 62a to 62n for occupation by time sharing of 2 µs.

(c-2) Circuit unit

Figure 9:
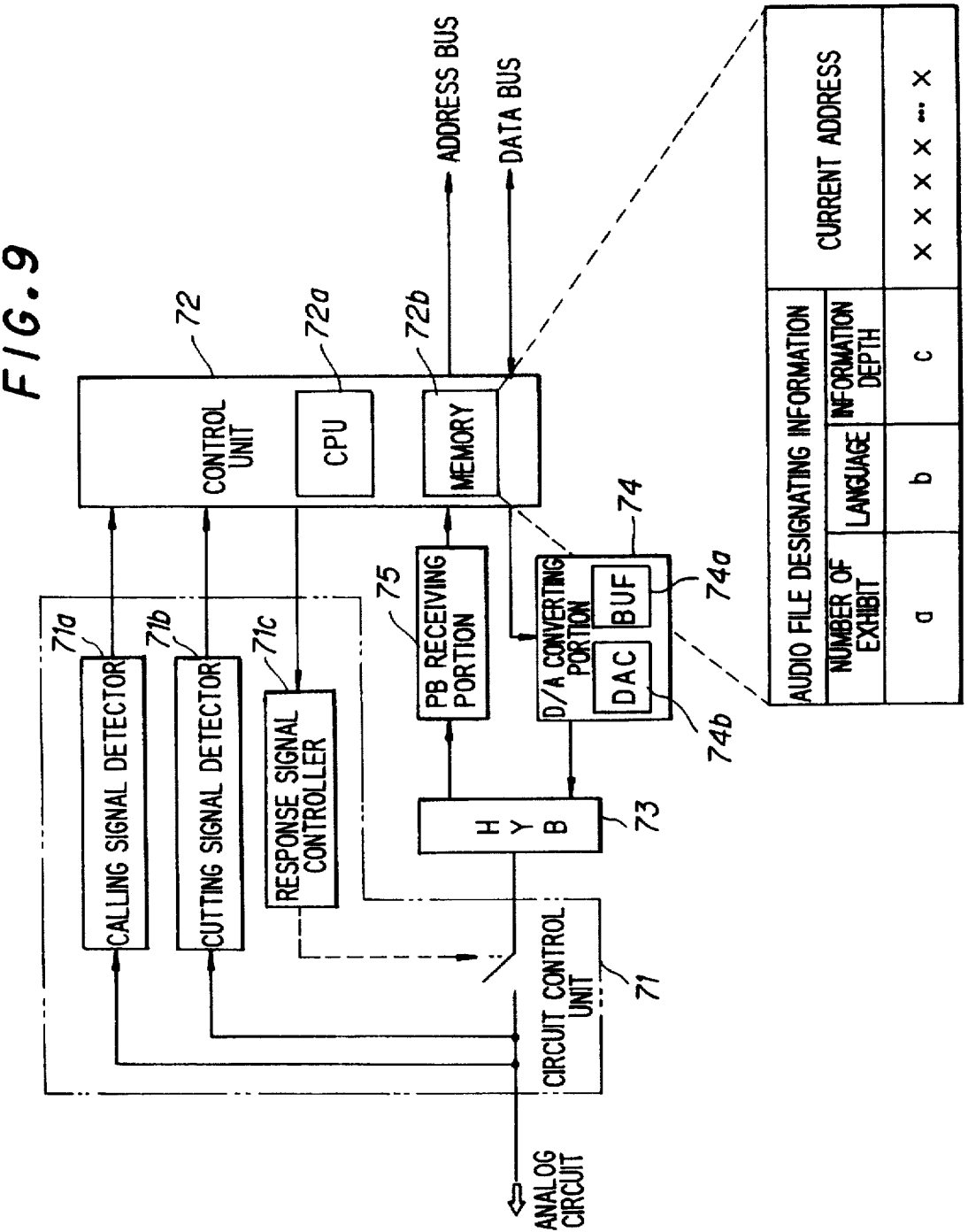
FIG. 9 show the structure of a circuit unit.

FIG. 9 shows the structure of a circuit unit. In FIG. 9, the reference numeral 71 represents a circuit control unit, and 72 a control unit for controlling the circuit unit as a whole. The control unit 72 is provided with a CPU 72a, a memory 72b, etc. The reference numeral 73 denotes a switch (hybrid circuit) outputting a signal from an analog circuit to the control unit 72 and transmitting an audio signal to the analog circuit, and 74 a D/A converting portion for converting the digital audio data read from a memory unit into an analog audio signal. The D/A converting portion 74 is provided with a buffer (BUF) 74a and D/A converter (DAC) 74b. The reference numeral 75 represents an MF signal receiving portion (PB receiving portion) for receiving an MF signal (push-button signal: PB signal), converting the number a of the exhibit, the selected language b and the selected information depth c transmitted in the form of the MF signal into digital data, and inputting the digital data into the control unit 72.

Combination of the number a of the exhibit, the selected language b and the selected information depth c constitutes audio file designating information, which is stored in the memory 72b of the control unit 72. In other words, when the CPU 72a of the control unit 72 receives audio file designating information (combination of the number a of an exhibit, a selected language b and a selected information depth c) from a portable terminal unit via the PB receiving portion 75, it stores the information into the memory 72b. The CPU 72a refers to the control unit 61 (FIG. 8) for the head address of the audio file designated by the audio file designating information abc, and stores the head address received from the control unit 61 in the memory 72b as the current address in correspondence with the audio file designating information abc. Thereafter, the CPU 72a reads digital audio data at the current address with a 125 µs period and inputs the data into the D/A converting portion 74. After 1 is added to the current address, the audio data reading operation is continued.

The circuit control unit 71 is provided with a calling signal detector 71a and a cutting signal detector 71b for detecting a calling signal and a cutting signal transmitted from the exchange 15, and a response signal controller 71c for transmitting a response signal to a call under the control of the control unit 72.

(d) Entire control
(d-1) Control at the start of the information guiding system

Figure 10:
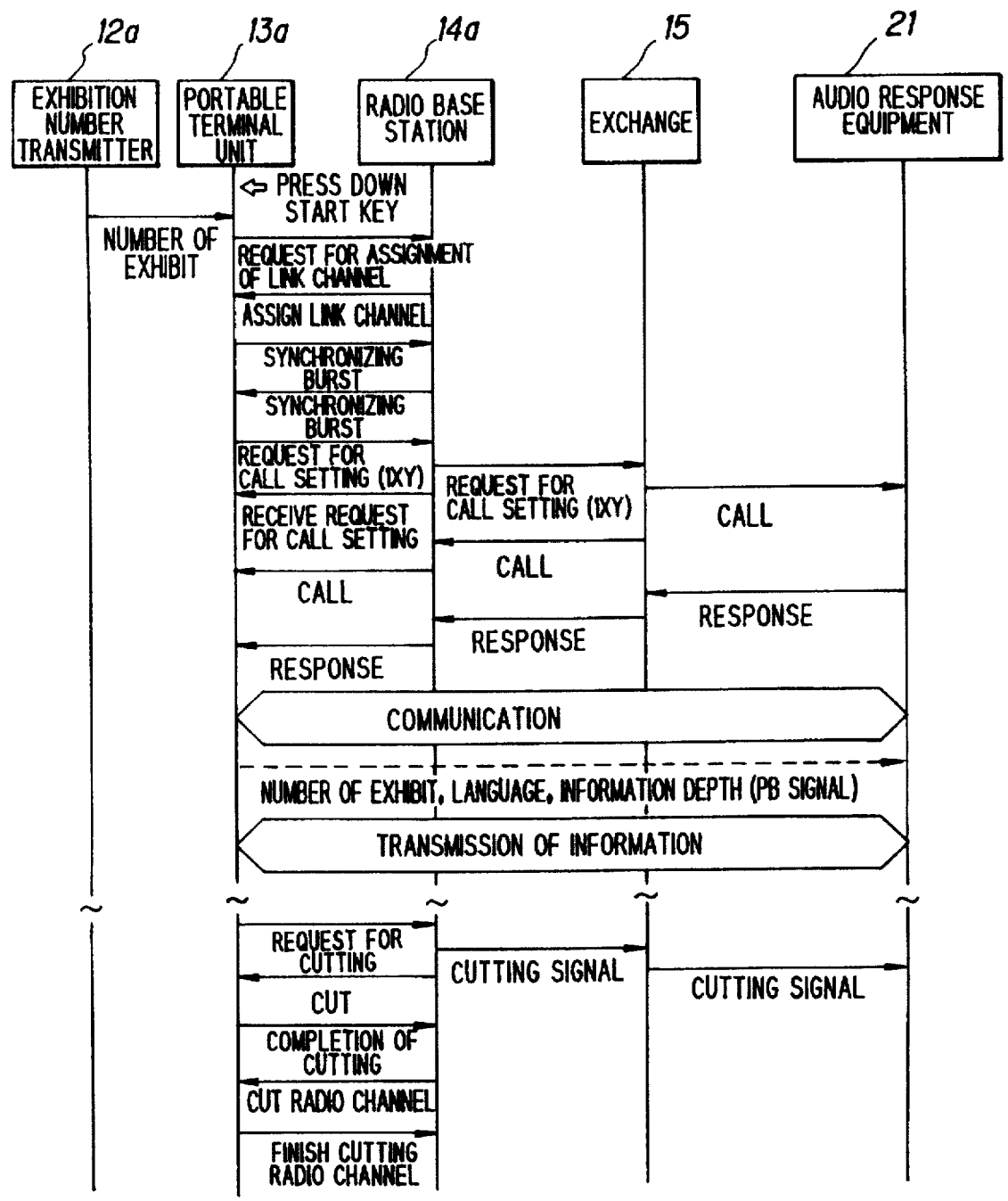
FIG. 10 is an explanatory view of a control sequence at the start of the information guiding system.

FIG. 10 is an explanatory view of the control sequence at the start of the information guiding system in the present invention.

When the carrier of a portable terminal unit (e.g., 13a) operates the start key STK, the controller 142 (FIG. 5) of the portable terminal unit 13a enables the infrared receiver 144, recognizes the number of an exhibit transmitted in the form of an infrared signal and stores the number in the memory 145. "Japanese" and "Schematic explanation" are stored as the default values in the memory 145. The controller 142 then instructs the TDMA processor 138 to transmit a calling signal (request for link channel assignment). The TDMA processor 138 inserts a calling signal (data on the request for link channel assignment) into a predetermined time slot of the control channel and transmits it from the antenna 131 to the radio base station 14a (FIG. 4) via the modulator 137 and the transmitter 134.

When the radio base station 14a receives the calling signal (data on the request for link channel assignment), it determines a predetermined time slot of a vacant radio circuit as the link channel (communication channel), and informs the portable terminal unit 13a of the allotted link channel. When the controller 142 of the portable terminal unit 13a receives the data (frequency, time slot) on the link channel via the TDMA processor 138, the controller 142 instructs the synthesizer 135 to output the frequency signal.

Thereafter, the portable terminal unit 13a and the radio base station 14a supply and receive a synchronizing burst signal to and from each other so as to establish synchronism. The portable terminal unit 13a transmits a service number, e.g., 1XY for calling the audio response equipment 21 to the radio base station 14a through the control channel (control circuit) as a dial number, and requests the radio base station 14a to set a call.

When the radio base station 14a receives the service number 1XY, it informs the portable terminal unit 13a of the reception of a request of call setting, and transmits the service number to the exchange 15 via the wire circuit 31 so as to request the exchange 15 to set a call. The exchange 15 judges the call to be a call to the audio response equipment 21 from the service number, searches for a vacant line (e.g., an analog circuit 41a) in the analog circuits 41a to 41n, and sets the vacant line as a speech path. The exchange 15 then supplies a calling signal to the audio response equipment 21 through the speech path 41a. When the circuit unit 62a (FIG. 8) connected to the speech path 41a receives the calling signal, it asks the control unit 61 whether or not the reception is possible, and if the answer is in the affirmative, the circuit unit 62a returns the response signal to the exchange 15. The exchange 15 informs the portable terminal unit 13a that there is a response from the audio response equipment 21 via the radio base station 14a through the communication channel. In this manner, the communication line between the portable terminal unit 13a and the audio response equipment 21 is established separately from another portable terminal unit.

When the controller 142 of the portable terminal unit 13a receives the response signal, the portable terminal unit 13a so controls the MF oscillator 141 as to output the number of the exhibit, the language and the information depth, which are stored in the memory 145, in the form of MF signals. The coding and decoding portion 139 converts the MF signals (the number of the exhibit, the language and the information depth) into digital data, and the TDMA processor 138 inserts the MF signals (digital) into a predetermined slot of the communication channel and transmits them from the antenna 131 to the radio base station 14a via the demodulator 137 and the transmitter 134.

The radio base station 14a returns the MF signals (digital) to the analog signals and transmits them to the circuit unit 62a of the audio response equipment 21 via the exchange 15 and the speech path 41a. The PB receiver (MF signal receiver) 75 in the circuit unit 62 converts the MF signals into the data on the number of the exhibit, the language and the information depth and inputs the data into the control unit 72. When the CPU 72a of the control unit 72 receives the audio file designating information (the number a of the exhibit, the language b and the information depth c) via the PB receiving portion 75, it stores the information in the memory 72b and refers to the control unit 61 (FIG. 8) for the head address of the audio file which is designated by the audio file designating information. The CPU 72a then stores the head address received from the control unit 61 in the memory 72b as the current address in correspondence with the audio file designating information abc. Thereafter, the CPU 72a reads digital audio data at the current address with a 125 μs period and inputs the data into the D/A converting portion 74. After 1 is added to the current address, the audio data reading operation is repeated in the same way.

The D/A converter 74 converts the digital audio data into analog audio signals and supplies them to the speech path 41a. The exchange 15 transmits the audio signals to the radio base station 14a. The radio base station 14a converts the audio signals into digital signals and supplies the digital signals to the portable terminal unit 13a through the communication channel. The receiver 133 of the portable terminal unit 13a takes out the digital signals from the communication channel and inputs them into the demodulator 136, which demodulates the audio data and inputs it into the TDMA processor 138. The TDMA processor 138 separates the digital audio data at a predetermined time slot of the communication channel and inputs the data into the coding and decoding portion 139. The coding and decoding portion 139 converts the digital audio data into analog audio signals and outputs them from the speaker or the earphone. In this manner, the borrower of the portable terminal unit 13a can listen to the explanation of the exhibits in a speech sound.

When the carrier finishes listening to the explanation of the exhibits and operates the stop key SPK, the portable terminal unit 13a transmits the request for stop to the radio base station 14a through the control channel. The cutting signal is transmitted to the exchange 15 and then to the audio response equipment 21, so that the line between the radio base station 14a and the exchange 15, and the line between the exchange 15 and the audio response equipment 21 are cut. When the radio base station 14a receives the request for stop, the radio base station 14a supplies and receives predetermined data to and from the portable terminal unit 13a in accordance with the procedure of cutting so as to cut the communication channel.

(d-2) Control at the time of listening to audio information

Figure 11:
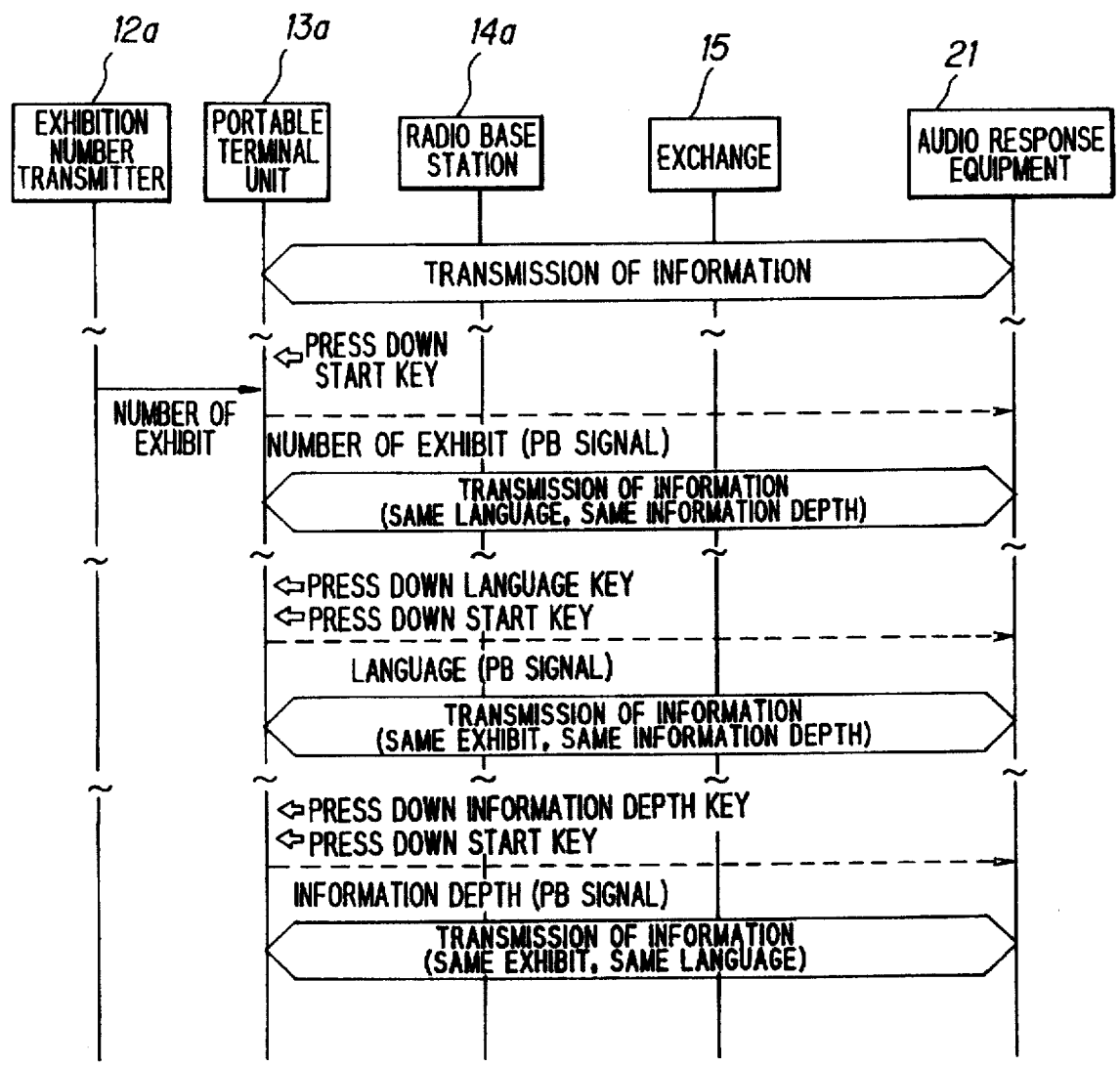
FIG. 11 is an explanatory view of a control sequence at the time of listening to audio information.

FIG. 11 is an explanatory view of a control sequence at the time of listening to audio information.

If the borrower of the portable terminal unit 13a goes to another exhibit and operates the start key STK while the audio response equipment 21 is transmitting audio information to the portable terminal unit 13a (when the carrier is listening to the audio information), the controller 142 of the portable terminal unit 13a enables the infrared receiver 144, recognizes the number of the exhibit which is transmitted in the form of an infrared signal, and stores it in the memory 145.

The controller 142 of the portable terminal unit 13a then so controls the MF oscillator 141 as to output the number of the exhibit stored in the memory 145 in the form of an MF signal. The MF signal is transmitted to the circuit unit 62a of the audio response equipment 21 via the radio base station 14a, the exchange 15 and the speech path 41a in the same way as described above. The PB receiver (MF signal receiver) 75 in the circuit unit 62 converts the MF signal into the number of the exhibit, which is input to the control unit 72°. When the CPU 72a of the control unit 72 receives the number of the exhibit, it (1) replaces the number of the exhibit stored in the memory 72b by the newly received number of the exhibit, (2) generates audio file designating information from the new number of the exhibit, and the language and the information depth stored in the memory 72b, and (3) refers to the control unit 61 (FIG. 8) for the head address of the audio file which is designated by the audio file designating information.

When the control unit 61 supplies the head address to the control unit 72 in response to the inquiry, the control unit 72 (1) stores the head address in the memory 72b as the current address in correspondence with the audio file designating information, (2) reads the digital audio data at the current address (head address) and inputs the data into the D/A converting portion 74, and (3) adds 1 to the current address and continues the audio data reading operation.

Thereafter the same operation is repeated, so that the carrier of the portable terminal unit 13a can listen to the explanation of a new exhibit in a speech sound. In other words, in the case of switching the audio information about the current exhibit over to the audio information about a different exhibit while listening to the explanation, it is possible to listen to the audio information about the new exhibit without the need for cutting the preset speech path.

When the carrier of the portable terminal unit 13a selects another language by operating the language key LGK and thereafter operating the start key STK while the audio response equipment 21 is transmitting audio information to the portable terminal unit 13a (while the carrier is listening to the audio information), the controller 142 stores the selected language in the memory 145.

The controller 142 then so controls the MF oscillator 141 as to output the selected language which is stored in the memory 145 in the form of an MF signal. The MF signal is transmitted to the circuit unit 62a of the audio response equipment 21 via the radio base station 14a, the exchange 15 and the speech path 41a. The PB receiver (MF signal receiver) 75 in the circuit unit 62 converts the MF signal into the data on the selected language, which is input to the control unit 72.

When the CPU 72a of the control unit 72 receives the selected language, it replaces the language stored in the memory 72b by the newly received selected language. The CPU 72a then generates audio file designating information from the newly selected language, and the number of the exhibit and the information depth stored in the memory 72b, and refers to the control unit 61 for the head address of the audio file which is designated by the audio file designating information. When the control unit 61 supplies the head address to the control unit 72 in response to the inquiry, the control unit 72 (1) stores the head address in the memory 72b as the current address in correspondence with the audio file designating information, (2) reads digital audio data at the current address (head address) and inputs the data into the D/A converting portion 74, and (3) adds 1 to the current address and continues the audio data reading operation.

Thereafter the same operation is repeated, so that the carrier of the portable terminal unit 13a can listen to the explanation in the newly selected language. In other words, it is possible to listen to the audio information in a desired language by designating the language.

When the carrier of the portable terminal unit 13a selects another information depth by operating the information depth key IDK and thereafter operating the start key STK while the audio response equipment 21 is transmitting audio information to the portable terminal unit 13a (while the carrier is listening to the audio information), the controller 142 stores the selected information depth in the memory 145.

The controller 142 then so controls the MF oscillator 141 as to output the information depth stored in the memory 145 in the form of an MF signal. The MF signal is transmitted to the circuit unit 62a of the audio response equipment 21 via the radio base station 14a, the exchange 15 and the speech path 41a. The PB receiver (MF signal receiver) 75 in the circuit unit 62 converts the MF signal into the selected information depth, which is input to the control unit 72. When the CPU 72a of the control unit 72 receives the selected information depth, it replaces the information depth stored in the memory 72b by the newly received information depth. The CPU 72a then generates audio file designating information from the newly selected information depth, and the number of the exhibit and the language stored in the memory 72b, and refers to the control unit 61 (FIG. 8) for the head address of the audio file which is designated by the audio file designating information.

When the control unit 61 supplies the head address to the control unit 72 in response to the inquiry, the control unit 72 (1) stores the head address in the memory 72b as the current address in correspondence with the audio file designating information, (2) reads digital audio data at the current address (head address) and inputs the data into the D/A converting portion 74, and (3) adds 1 to the current address and continues the audio data reading operation.

Thereafter the same operation is repeated, so that the carrier of the portable terminal unit 13a can listen to the explanation at the selected information depth. In other words, it is possible to listen to the audio information with the desired degree of detailedness of explanation by designating the information depth.

Figure 12:
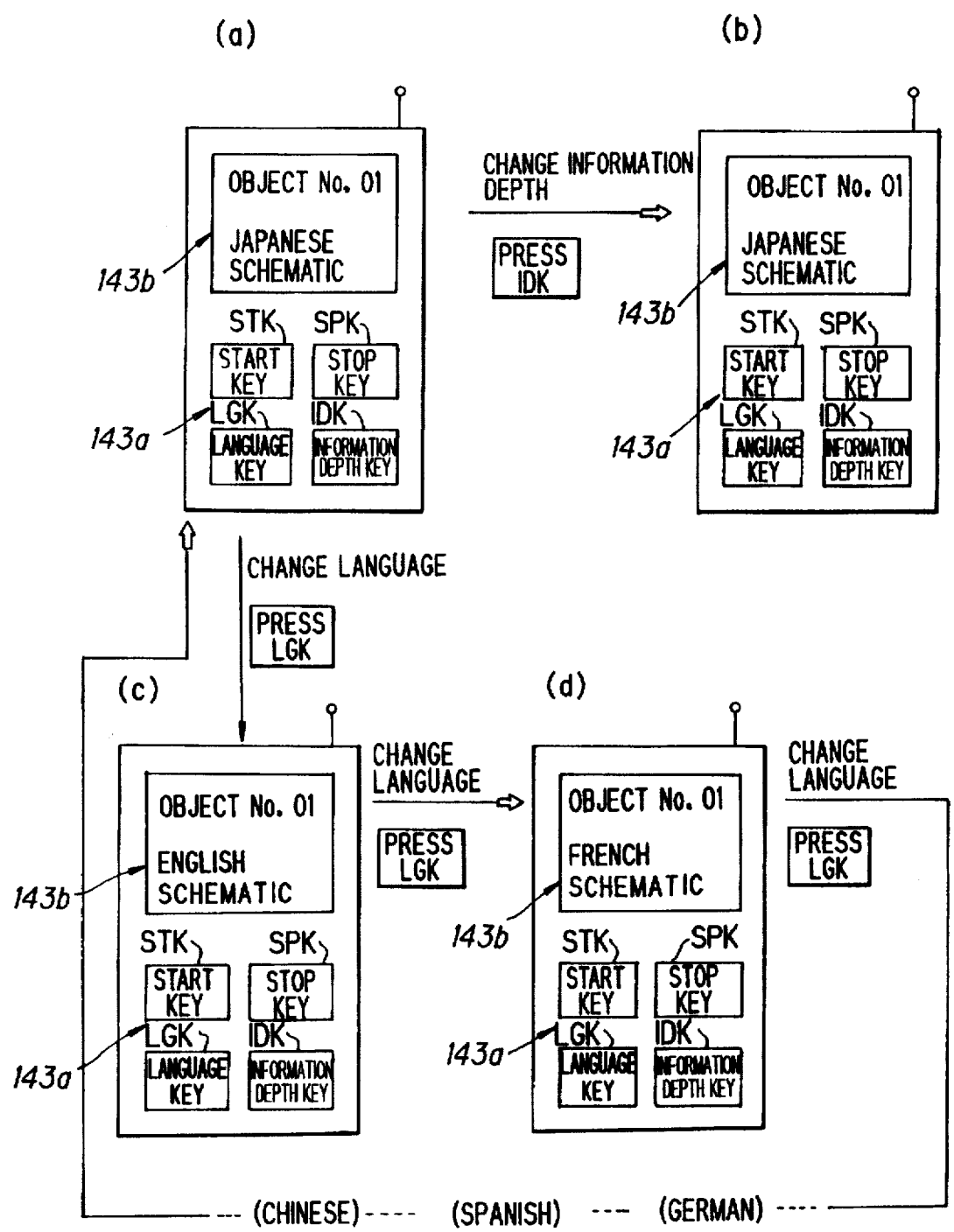
FIG. 12 show an example of the letters displayed on the display portion of the portable terminal unit.

FIG. 12 is an explanatory view of a display of the letters displayed on the display portion 143b of the portable terminal unit when the carrier of the portable terminal unit (1) operates the language key LGK so as to select another language, and (2) operates the information depth key IDK so as to select another information depth while the carrier is listening to audio information.

When the number of an exhibit is "01", the language is "Japanese", and the information depth is "schematic explanation", the Japanese letters indicating the information are displayed on the display unit 143b (see (a)). In this state, when the information depth key IDK is operated, the information depth is changed to "detailed explanation", and Japanese letters indicating "detailed explanation" is displayed on the display portion 143b in place of "schematic explanation" (see (b)).

In the state of (a), when the language key LGK is pressed down once, the language is changed from "Japanese" to "English", and the English letters "Object No. 01", "English", "Schematic" are displayed on the display unit 143b (see (c)). When the language key LGK is pressed down once more, the language is changed from "English" to "French", and the English letters "Object No. 01", "French", "Schematic" displayed in the display unit 143b (see (d)). Thereafter, every time the language key LGK is pressed down, the language displayed is changed for example, "German", "Spanish", "Chinese", "Japanese" and "English" in that order.

(e) First modification

In the above-described embodiment, audio files in a plurality of languages per exhibit and per information depth are stored in the audio response equipment 21. However, there is a case in which only one language is used for explanation (e.g., Japanese). In this case, an audio file is designated by the number of an exhibit and the information depth. That is, the same number of audio files as the number of exhibits multiplied by the number of information depths are provided in the audio response equipment 21. It is therefore possible to listen to the audio information of the audio file which corresponds to the number of the exhibit and the information depth by inputting the number of the exhibit and the information depth from the portable terminal unit (13a to 13m).

There is a case in which only one information depth is used for explanation. In this case, an audio file is designated by the number of an exhibit and the language. That is, the same number of audio files as the number of exhibits multiplied by the number of languages are provided in the audio response equipment 21, and it is possible to listen to the audio information of the audio file which corresponds to the number of the exhibit and the language by inputting the number of the exhibit and the language from the portable terminal unit (13a to 13m).

There is a case in which only one language and one information depth are used for explanation. In this case, the number of exhibit constitutes audio file designating information. Therefore, it is possible to listen to the audio information of the audio file which corresponds to the number of the exhibit by inputting the number of the exhibit from the portable terminal unit (13a to 13m).

(f) Second modification

Figure 13:
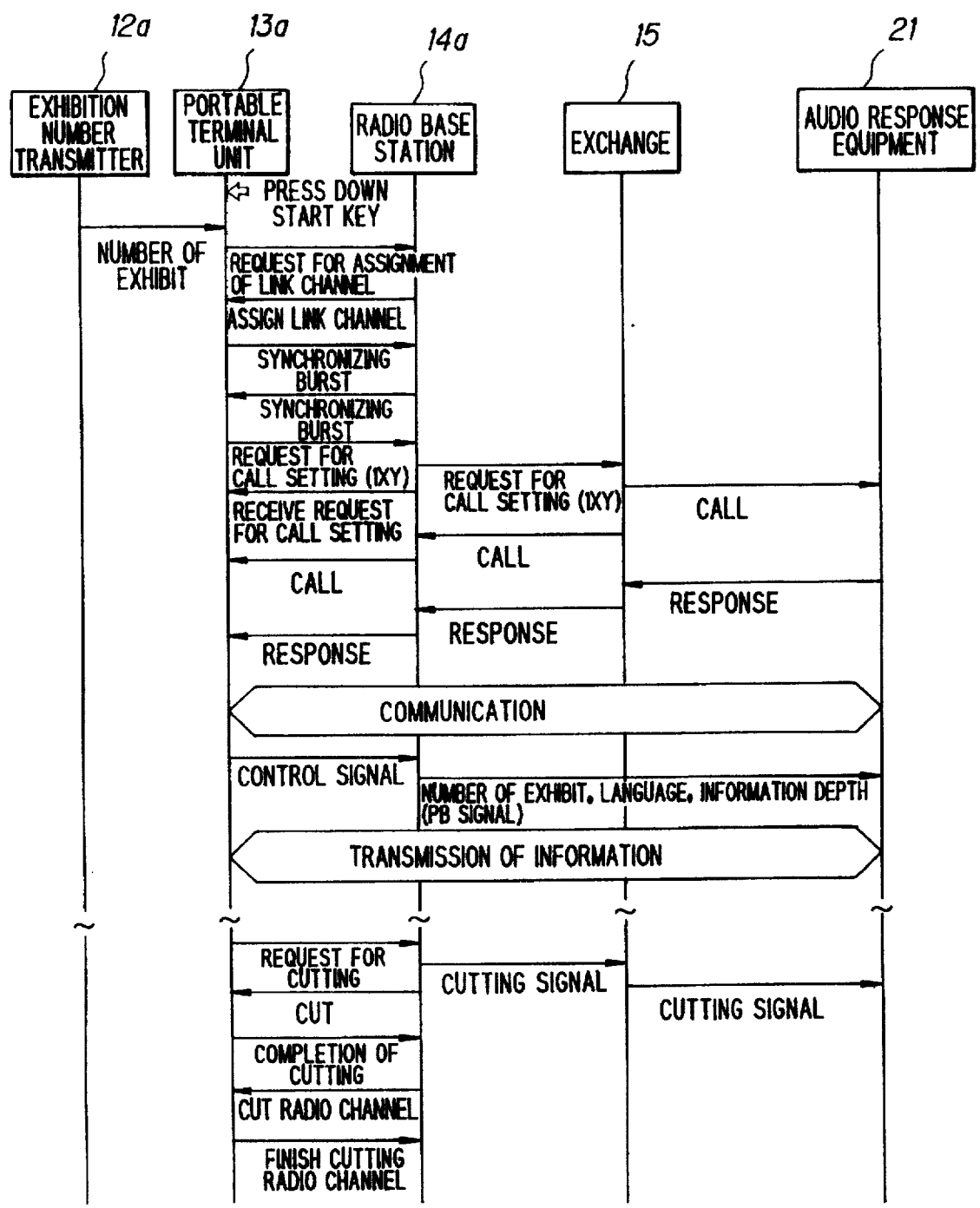
FIG. 13 is an explanatory view of another control sequence at the start of the information guiding system.

In the above-described embodiment, the information (the number of the exhibit, the language, the information depth) for designating an audio file is transmitted from the portable terminal unit 13a in the form of audible sound signals (MF signals). Alternatively, it is possible to transmit the information to the radio base station 14a through the control channel (control circuit) so that the radio base station 14a converts the information into MF signals and transmits the MF signals to the audio response equipment 21. FIG. 13 shows a control sequence having such a structure at the start of the information guiding system.

The control sequence shown in FIG. 13 is different from that shown in FIG. 10 in the following points.

(1) When the portable terminal unit 13a receives a response signal, the portable terminal unit 13a transmits the information (the number of the exhibit, the language, the information depth) for designating an audio file as the control information to the radio base station 14a through the control channel (control circuit).

(2) The radio base station 14a converts the information (the number of the exhibit, the language, the information depth) into MF signals and transmits the MF signals to the audio response equipment 21.

In the above-described embodiment, when the carrier of the portable terminal unit 13a changes the number of the exhibit by operating the start key STK, selects another language by operating the language key LGK or selects another information depth by operating the information depth key IDK while the carrier is listening to audio information, the information (the number of the exhibit, the language, the information depth) is transmitted from the portable terminal unit 13a in the form of audible sound signals (MF signals). Alternatively, it is possible to transmit the information to the radio base station 14a through the control channel so that the radio base station 14a converts the information into MF signals and transmits the MF signals to the audio response equipment 21.

Figure 14:
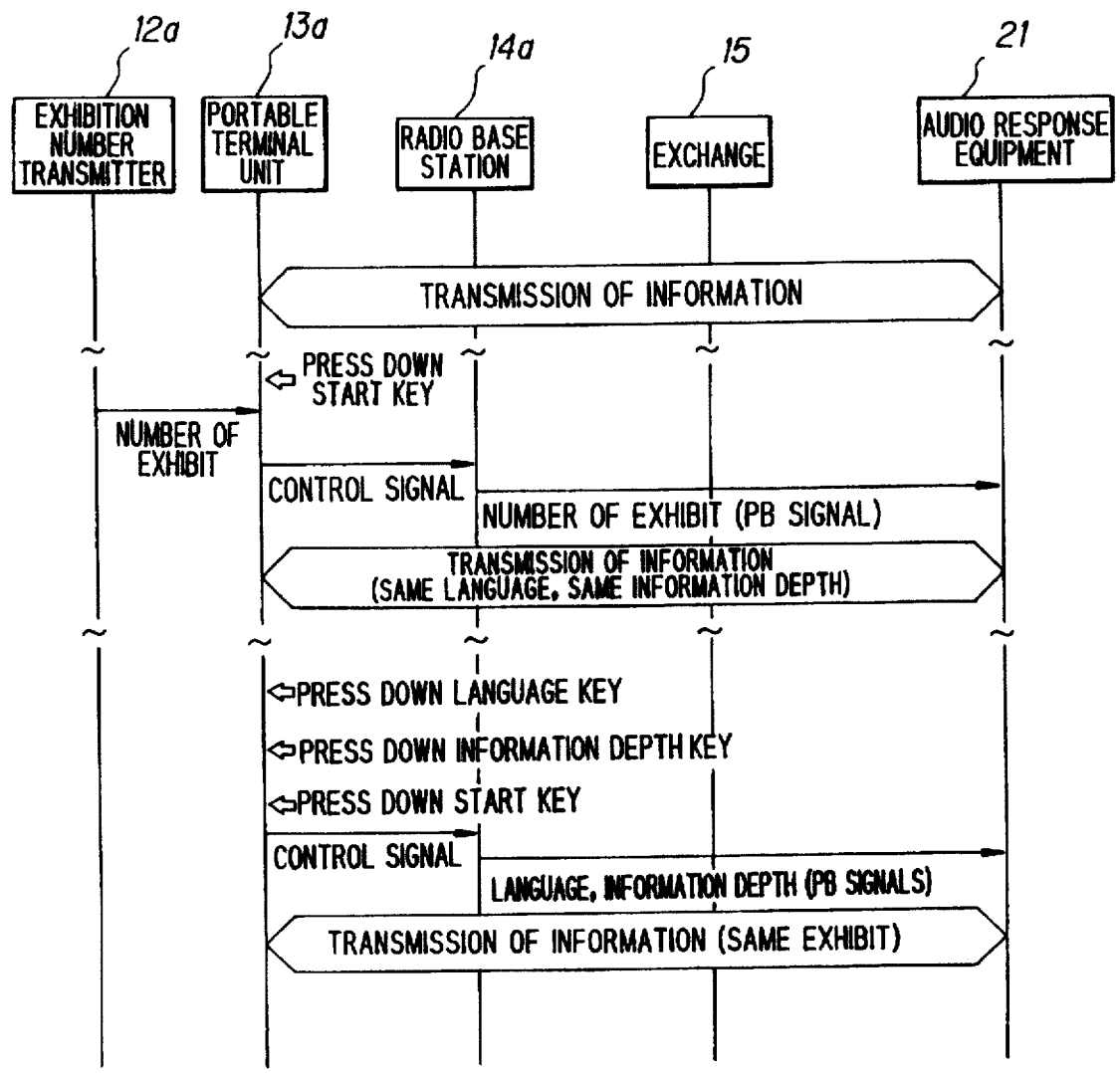
FIG. 14 is an explanatory view of another control sequence at the time of listening to audio information.

FIG. 14 shows the control sequence having such a structure at the time of listening to audio information.

The control sequence shown in FIG. 14 is different from that shown in FIG. 11 in the following points.

(1) When the start key STK is operated while the carrier is listening to audio information, the portable terminal unit 13a transmits the number of the exhibit as the control information to the radio base station 14a through the control channel.

(2) The radio base station 14a converts the number of the exhibit into MF signal and transmits the MF signal to the audio response equipment 21.

(3) When the language key LGK or the information depth key IDK is operated while the borrower is listening to audio information, the portable terminal unit 13a transmits the language or the information depth as the control information to the radio base station 14a through the control channel.

(4) The radio base station 14a converts the language or the information depth into an MF signal and transmits the MF signal to the audio response equipment 21.

(g) Third modification

In the control sequence shown in FIG. 10, after the communication line between the portable terminal unit 13a and the audio response equipment 21 is established by the request for setting a call, the information (the number of the exhibit, the language, the information depth) for designating an audio file is transmitted from the portable terminal unit 13a in the form MF signals. Alternatively, the portable terminal unit 13a may transmit the information (the number of the exhibit, the language, the information depth) for designating an audio file as the control information at the same time with the supply of the request for setting a call (service number).

Figure 15:
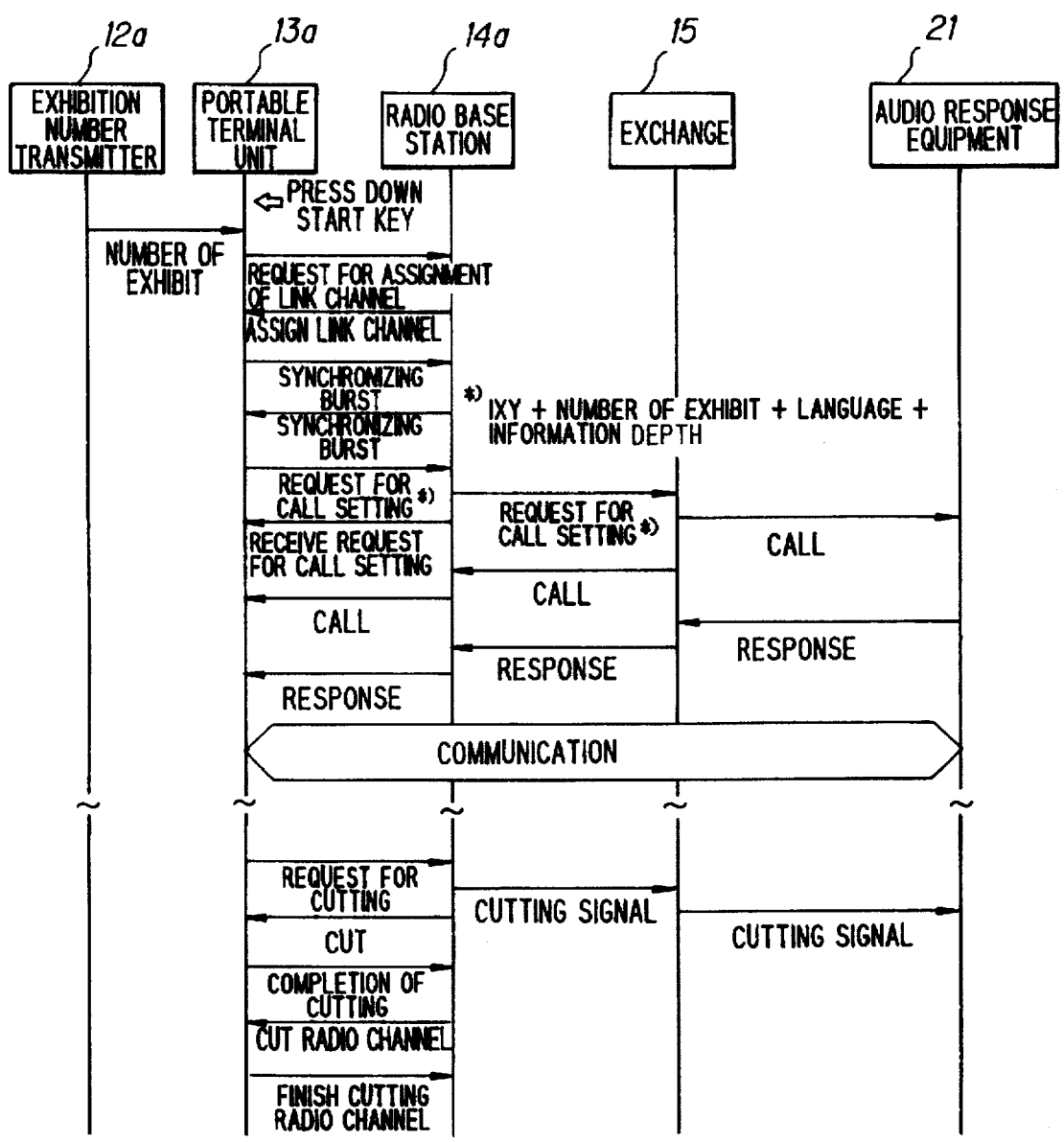
FIG. 15 is an explanatory view of still another control sequence at the start of the information guiding system.

FIG. 15 shows the control sequence having such a structure at the time of start of the information guiding system.

The control sequence shown in FIG. 15 is different from that shown in FIG. 10 in the following points.

(1) After establishment of synchronism, the portable terminal unit 13a transmits the number of the exhibit, the language, the information depth are transmitted to the radio base station 14a together with the service number 1XY (request for setting a call).

(2) The radio base station 14a transmits the number of the exhibit, the language, the information depth to the exchange 15 in the form of MF signals together with the service number 1XY.

(3) After the exchange 15 sets a speech path for the audio response equipment 21, the exchange 15 transmits the number of the exhibit, the language, the information depth to the audio response equipment 21 through the speech path together with the calling signal.

In the above embodiments, a digital portable terminal unit is used as the portable terminal unit, but an analog portable terminal unit is also usable.

In the above explanation, the number of an exhibit is input from a feeble signal transmitter provided in the vicinity of the exhibit, but a structure in which the carrier inputs the number of an exhibit by operating a key may be used instead.

Figure 16:
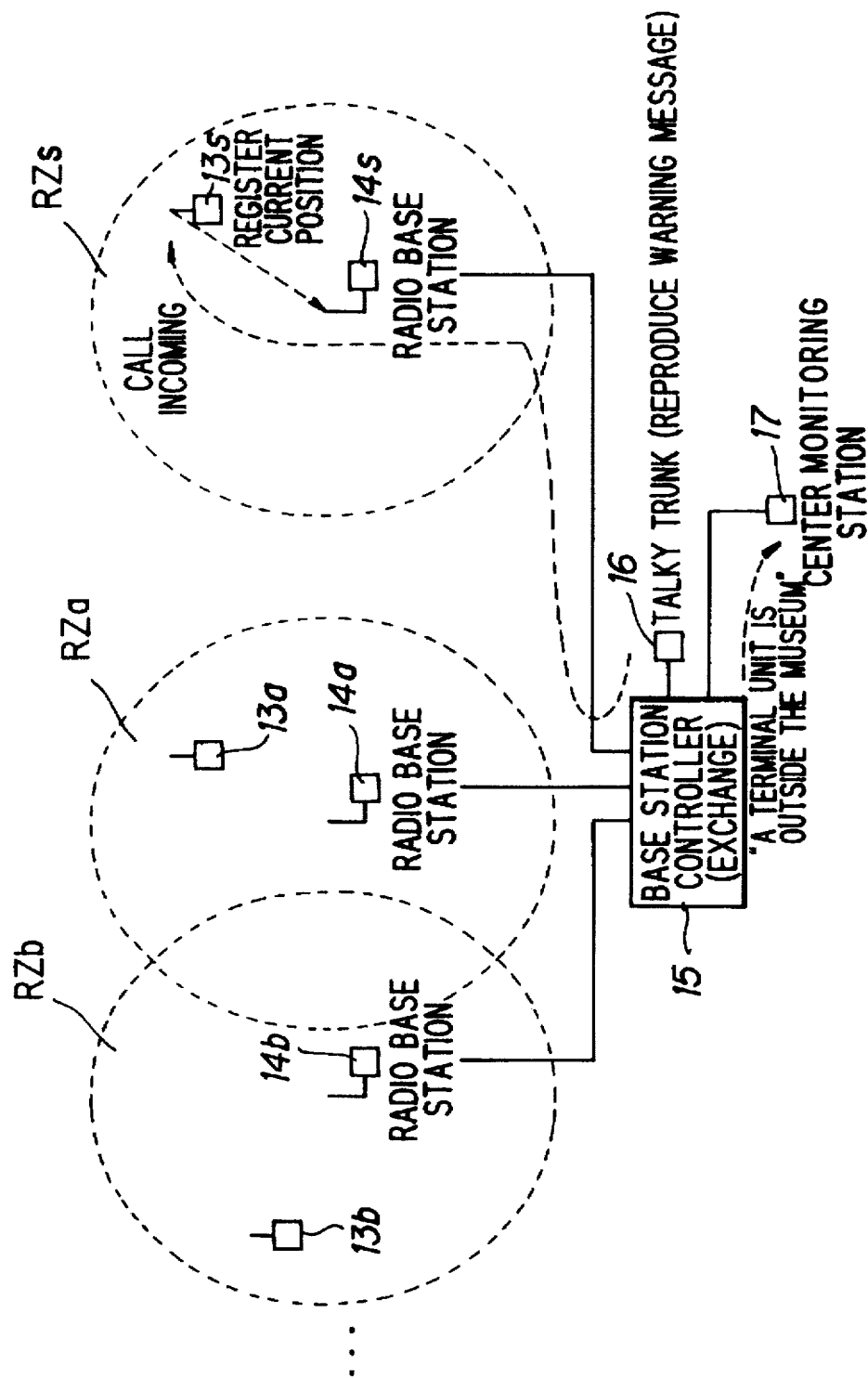
FIG. 16 is an explanatory view of a first embodiment of a method of preventing a borrower of a portable terminal unit from forgetting to return it according to the present invention.

(C) Embodiment of a method of preventing a borrower of a portable terminal unit from returning it (a) First embodiment (a-1) Schematic explanation of a first embodiment FIG. 16 is an explanatory view of a first embodiment of a method of preventing a borrower of a portable terminal unit from returning it according to the present invention. In FIG. 16, the reference numerals 13a, 13b and 13s represent portable terminal units, 14a and 14b radio base stations for guiding provided within a museum such as an art museum, 14s an radio base station disposed in a special place such as the vicinity of the entrance and the exit of a museum, 15 a base station controller (exchange) for controlling the radio base stations, 16 a talky trunk for outputting a message which prevents a borrower of a portable terminal unit from forgetting to return it, and 17 a center monitoring station which notifies that the a portable terminal unit has been carried out of the museum by sounding an alarm and displays the number of the portable terminal unit. The symbols RZa to Rzs represent radio zones (radio wave propagation ranges) of the respective radio base stations 14a to 14s.

A specific radio base station 14s for preventing a borrower of a portable terminal unit from returning it is disposed in a special place such as the entrance and the exit of the museum, and a specific radio signal is transmitted from the radio base station 14s. Each of the portable terminal units 13a to 13s detects that it has entered the radio zone RZs which is controlled by the radio base station 14s when the portable terminal unit receives the specific radio signal. The portable terminal unit 13s existing in the radio zone RZs supplies a signal which indicates that the portable terminal unit 13 has entered the radio zone RZs to the base station controller 15 via the radio base station 14s. When the base station controller 15 is informed that the portable terminal unit 13s has entered the specific radio zone RZs, it calls the portable terminal unit 13s and transmits a message for preventing a borrower of a portable terminal unit from returning it from the talky trunk 16. The portable terminal unit 13s receives the message and outputs it in a speech sound. In addition, the base station controller 15 informs the center monitoring station 17 that a portable terminal unit 13s has been carried out of the museum.

(a-2) Portable terminal unit

Figure 17:
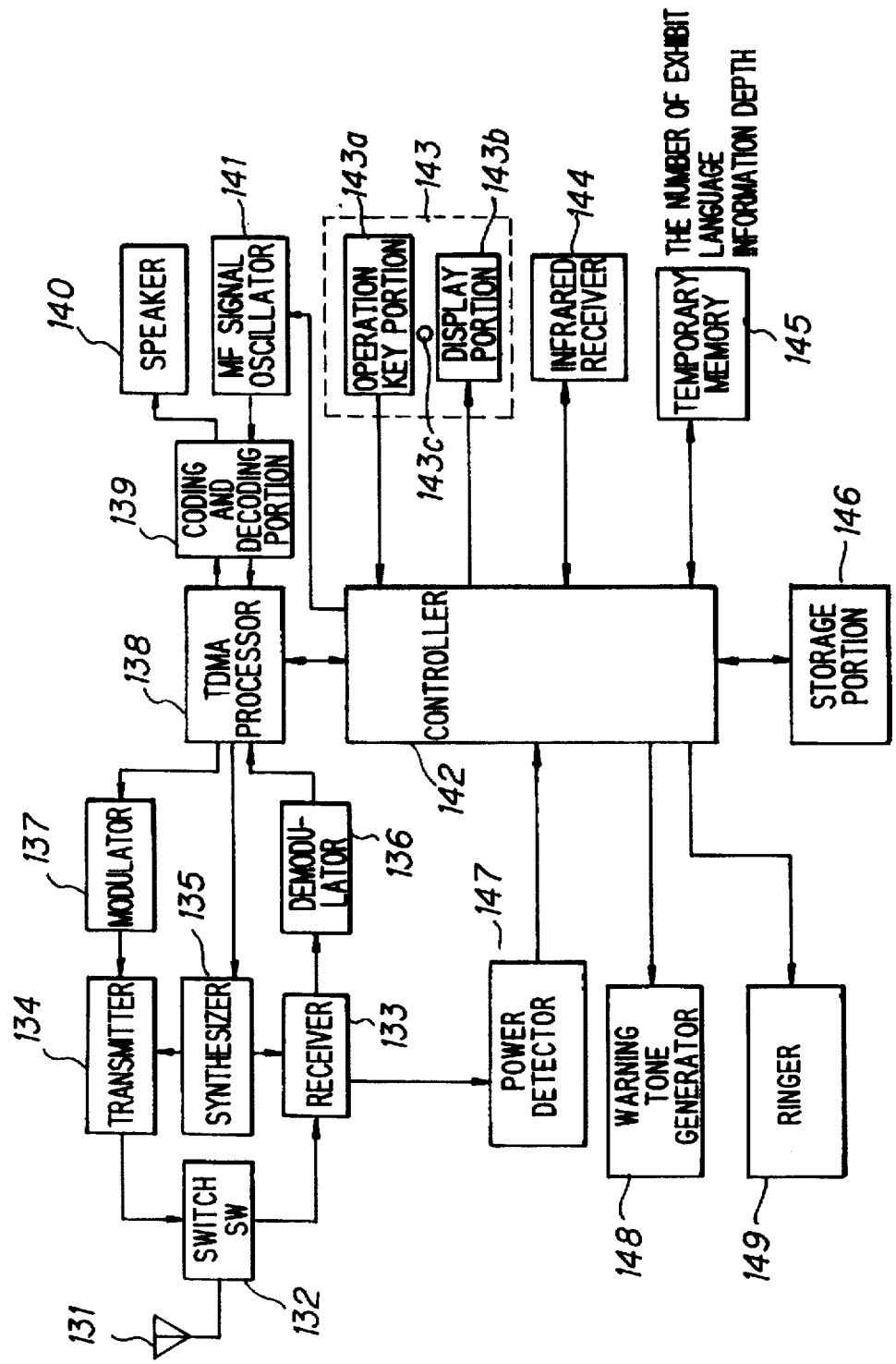
FIG. 17 shows the structure of a portable terminal unit having a function of preventing the borrower from forgetting to return it.

FIG. 17 shows the structure of a portable terminal unit having a function of preventing the borrower from returning it. The portable terminal unit is different from that shown in FIG. 5 that there are newly provided an off-hook key 143c, a storage portion 146 for storing position information or the like which indicates the area to which the portable terminal unit belongs, a power detector 147, a warning tone generator 148 for outputting a message for preventing a borrower of a portable terminal unit from returning it in a speech sound, and a ringer 149 for generating a calling sound.

Figure 18:
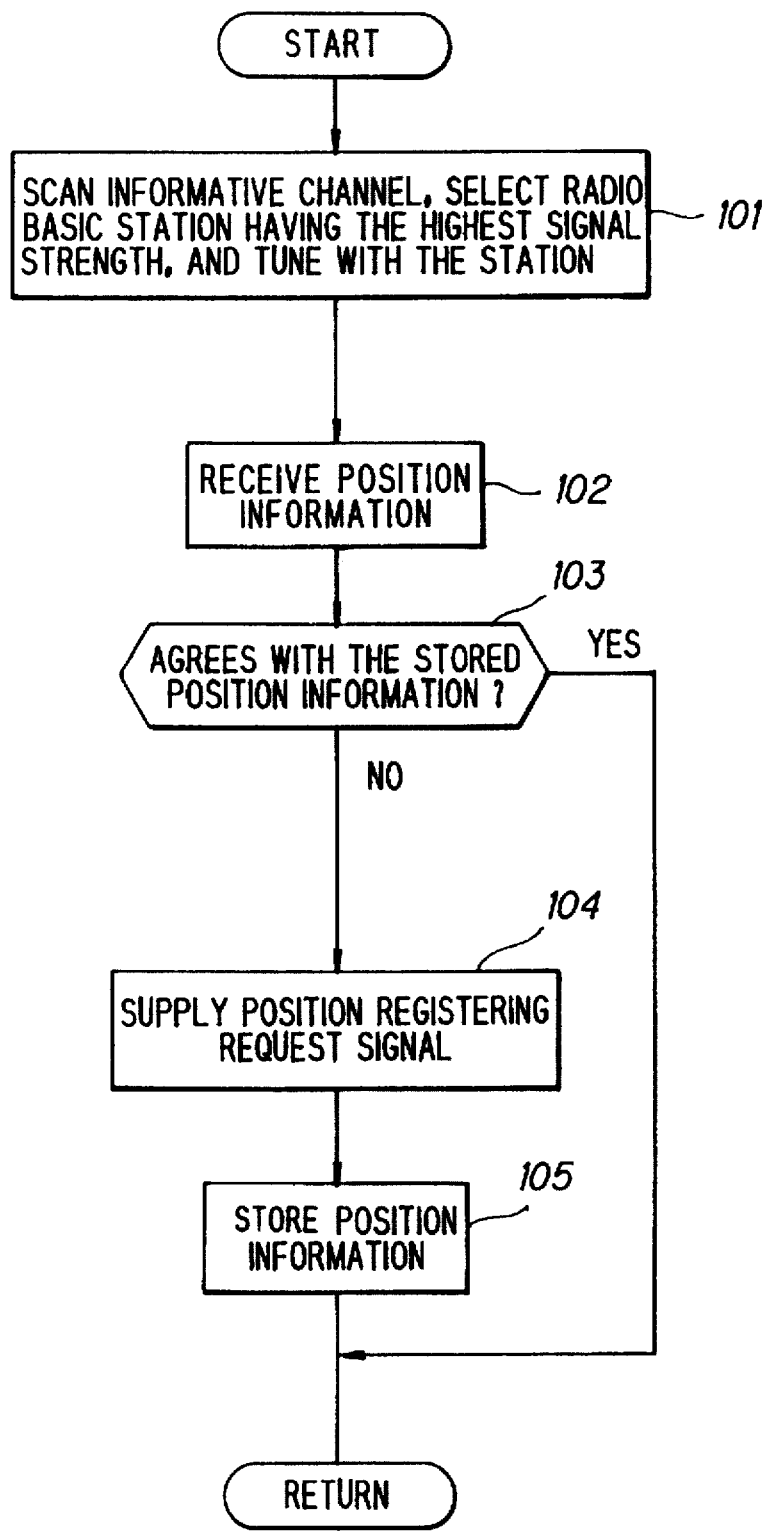
FIG. 18 is a flow chart of a position registering process for the portable terminal unit.

FIG. 18 is a flow chart of a position registering process of a portable terminal unit. The portable terminal unit scans the information channel (control channel) of each radio base station, selects the radio base station which has the highest signal strength and tunes with the channel (step 101). The portable terminal unit receives information from the communication channel (step 102), and compares the position information contained in the information with the position information which is received latest and which is stored in the storage portion 146 (step 103). If the former position information agrees with the latter one, it indicates that there is no change in the area, so that the process returns to the beginning and the subsequent processing is executed. However, if the former position information is different from the latter one, since it means that the portable terminal unit has been moved to a different area, the portable terminal unit transmits a position registering request signal to the radio base station (step 104). The position registering request signal contains the number of the portable terminal unit.

The portable terminal unit then receives a position registering reception signal which indicates that the position registering is normally finished, and updates the contents of the storage portion 146 (step 105).

(a-3) Base station controller

Figure 19:
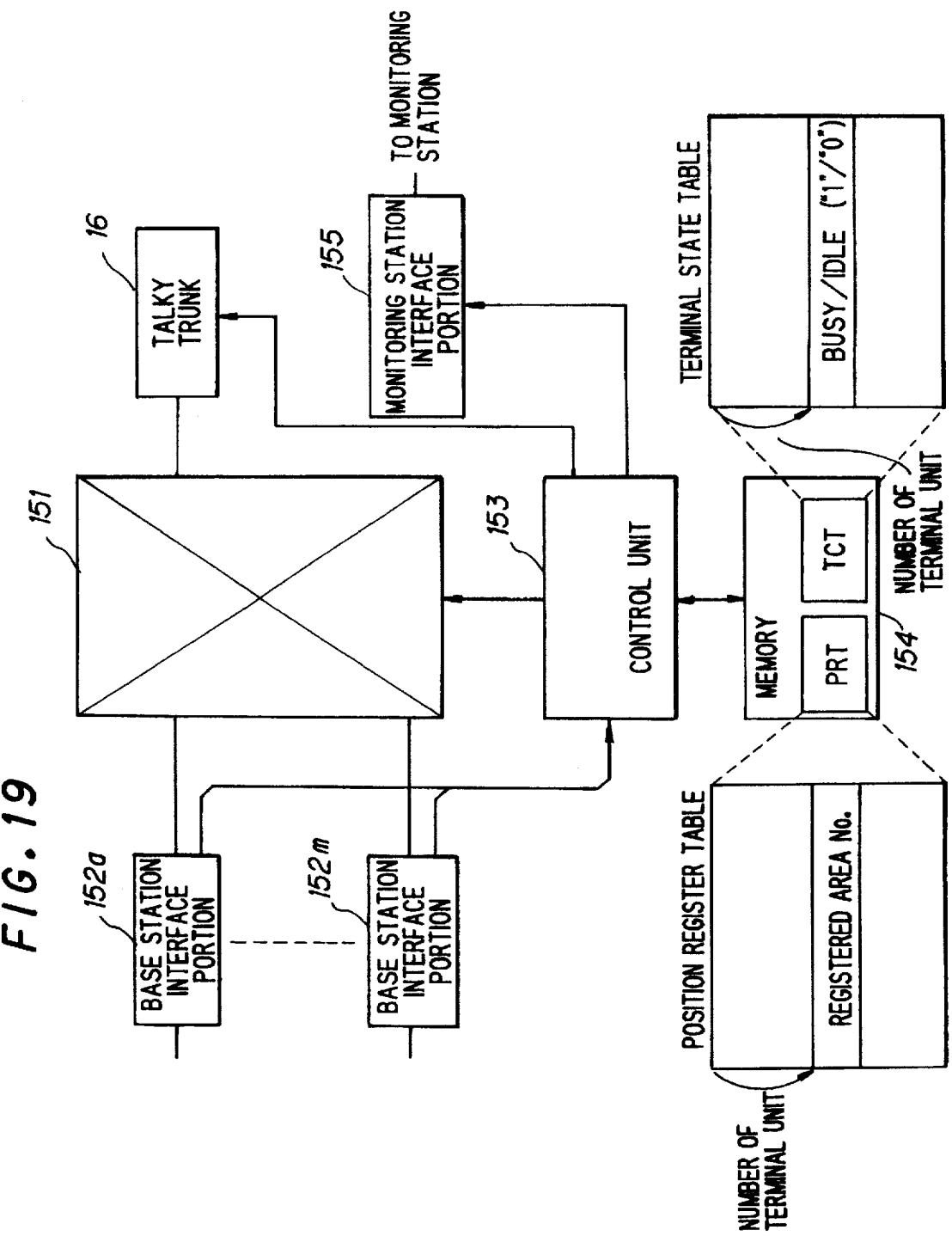
FIG. 19 show the structure of a base station controller.

FIG. 19 shows the structure of a base station controller (exchange) 15. In FIG. 19, the reference numeral 151 represents a channel switch, 152a to 152m base station interface portions serving as the interfaces between the base stations and the base station controller 15, and 153 a control unit having a computer structure for executing switching control, controlling the position registering operation of a portable terminal unit, monitoring the state of each portable terminal unit so as to judge whether or not it is busy, and executing control for preventing a borrower of a portable terminal unit from returning it by using a computer. The reference numeral 154 represents a memory for storing various data in a position register table PRT, a terminal state table TCT, etc., and 155 a monitoring station interface portion serving as the interface between the center monitoring station and the base station controller 15.

The position register table PRT in the memory 154 records the number of an area to which a portable terminal unit is situated in correspondence with the number of the portable terminal unit. When the power of the portable terminal unit is turned on, or when the portable terminal unit moves and, hence, the area changes, the portable terminal unit transmits a position registering request (including the number of the portable terminal unit) to the base station controller 15 via the radio base station in the current area to which the portable terminal unit belongs. When the control unit 153 of the base station controller 15 receives the position registering request from a predetermined radio base station, the control unit 153 registers the number of the area of the radio base station in the position register table PRT in correspondence with the number of the portable terminal unit and replaces the current area number by the new area number.

The terminal state table TCT of the memory 154 records whether or not each portable terminal unit is busy in correspondence with the number of the portable terminal unit. When the control unit 153 receives a request for setting a call to the audio response equipment 21 from a portable terminal unit via a radio base station, the control unit 153 connects the portable terminal unit with the audio response equipment 21. At this time, "busy" ("1") is recorded in the terminal state table TCT in correspondence with the number of the portable terminal unit, and when the communication is finished, "idle" ("0") is recorded at that position.

(a-4) Center monitoring station

Figure 20:
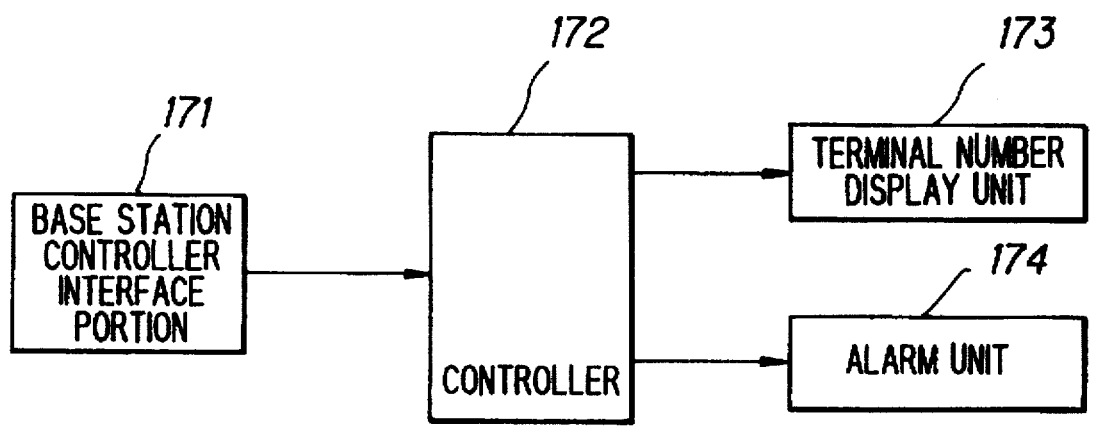
FIG. 20 shows the structure of a center monitoring station.

The center monitoring station 17 is disposed within a management room provided in the vicinity of the entrance or the exit of a museum. FIG. 20 shows the structure of a center monitoring station. The center monitoring station 17 is composed of an base station controller interface portion 171 serving as the interface between the base station controller 15 and the center monitoring station 17, a controller 172, a terminal number display unit 173 for displaying the number of a terminal unit when it is informed that the terminal unit has been carried out of the museum, and an alarm unit 174 for sounding an alarm to inform that a terminal unit has been carried out of the museum.

Figure 21:
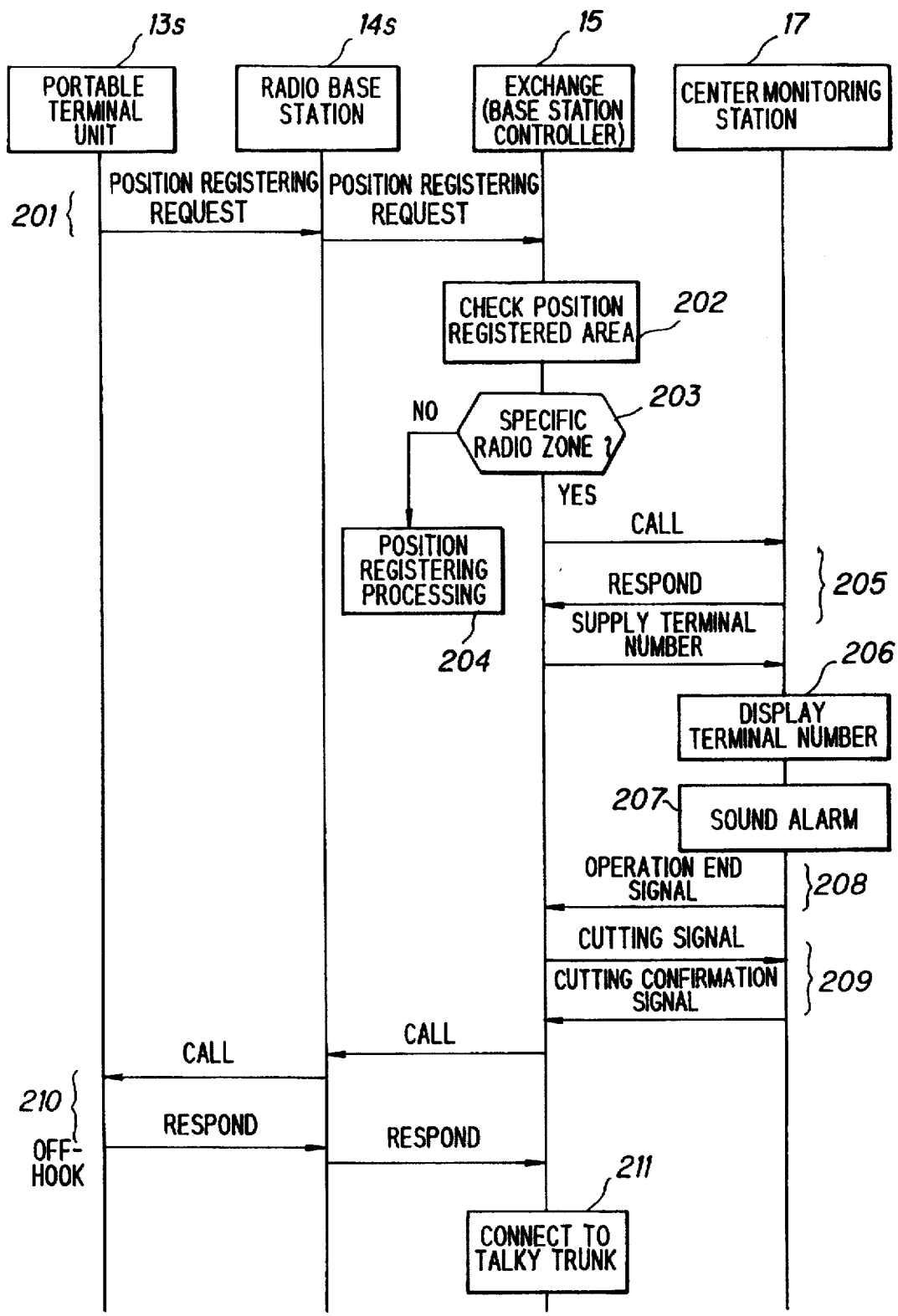
FIG. 21 is an explanatory view of the process of preventing a borrower of a portable terminal unit from forgetting to return it in the first embodiment.

(a-5) Control for preventing a borrower of a portable terminal unit from returning it FIG. 21 is an explanatory view of the process of preventing a borrower of a portable terminal unit from forgetting to return it in the first embodiment.

When the portable terminal unit 13s (FIG. 16) is carried out of the museum and enters the radio zone RZs, the position information received when the portable terminal unit 13s enters the radio zone RZs is different from the latest received position information. For this reason, the portable terminal unit 13s transmits a position registering request to the base station controller 15 via the radio base station 14s (step 201).

When the control unit 153 (FIG. 19) of the base station controller 15 receives the position registering request, the control unit 153 judges to which area the radio base station which has transmitted the request signal belongs (steps 202, 203). If the area is not the radio zone RZs, the control unit 153 executes normal position registering processing (step 204). On the other hand, if the area is the radio zone RZs, the control unit 153 calls the center monitoring station 17 and if there is a response, the control unit 153 transmits the terminal number which is contained in the position registering request to the center monitoring station 17 (step 205). When the center monitoring station 17 receives the terminal number, it displays the terminal number on the display unit 173 (step 206), sounds an alarm of the alarm unit 174 so as to inform that the portable terminal unit 13s has been carried out of the museum (step 207). Thereafter, the center monitoring station 17 supplies an operation end signal to the control unit 153 (step 208). When the control unit 153 receives the operation end signal, it transmits a cutting signal to the center monitoring station 17, and after it receives a cutting confirmation signal from the center monitoring station 17, the control unit 153 cuts the connection between the base station controller 15 and the center monitoring station 17 (step 209).

The base station controller 15 then calls the portable terminal unit 13s which has entered the radio zone RZs via the radio base station 14s, and if the borrower of the portable terminal unit 13s returns an off-hook response by operating the off-hook key 143c (step 210), the base station controller 15 starts an announce device (not shown) and connects the portable terminal unit 13s with the talky trunk 16 (step 211), whereby a message for preventing a borrower of a portable terminal unit from returning it is transmitted to the portable terminal unit 13s. The portable terminal unit 13s receives the message and outputs the message in a speech sound from the speaker 140.

According to this structure, when a portable terminal unit is carried out of the museum and enters the radio zone RZs, an alarm is sounded from the center monitoring station and a warning message is output in a speech sound when the portable terminal unit returns an off-hook response, so that it is possible to prevent the borrower of the portable terminal unit from forgetting to return it.

(b) Second embodiment

Figure 22:
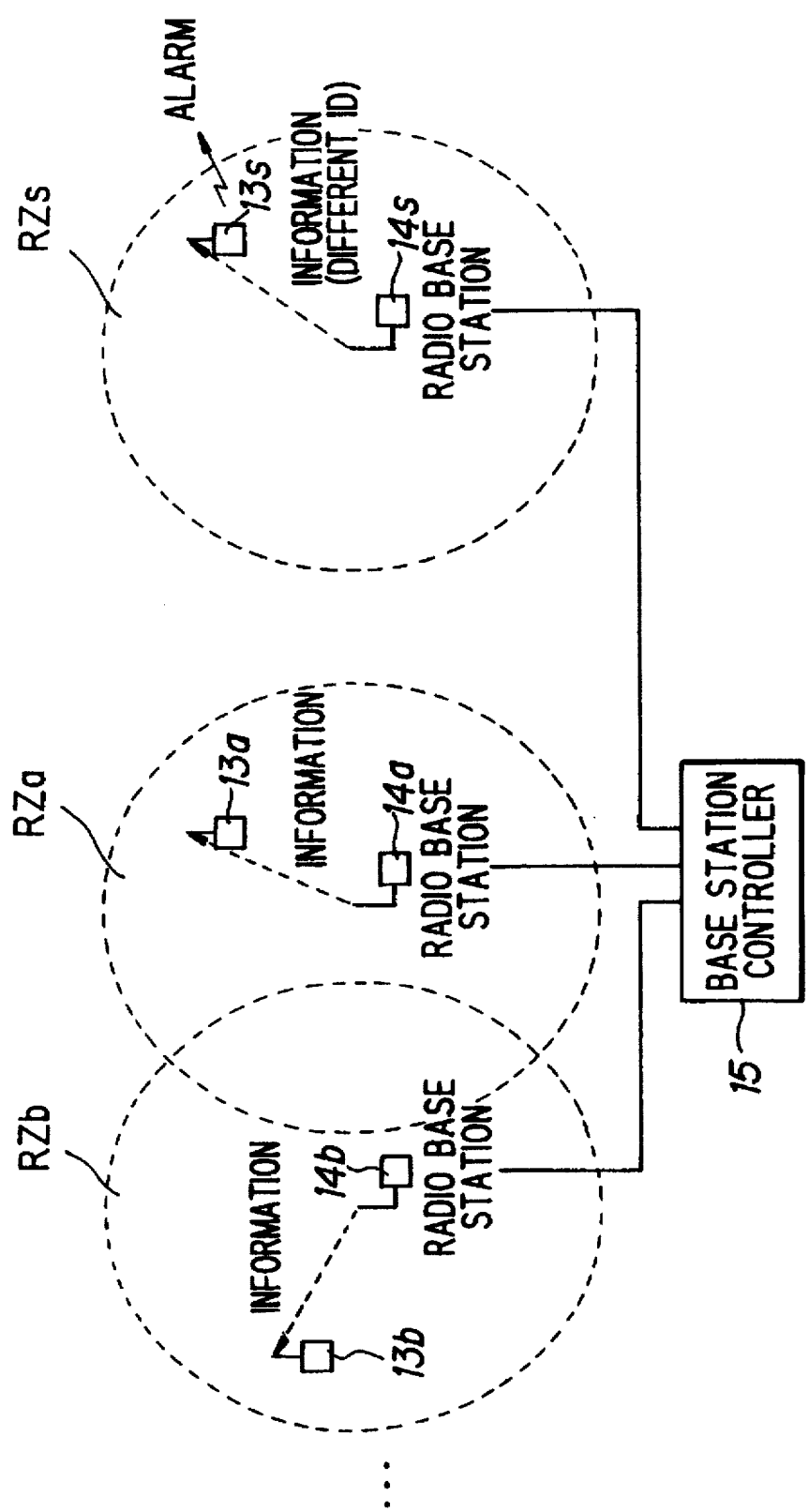
FIG. 22 is a schematic explanatory view of a second embodiment of a method of preventing a borrower of a portable terminal unit from forgetting to return it according to the present invention.

FIG. 22 is an explanatory view of a second embodiment of a method of preventing a borrower of a portable terminal unit from returning it according to the present invention. In FIG. 22, the reference numerals 13a, 13b and 13s represent portable terminal units, 14a and 14b radio base stations for guiding provided within a museum such as an art museum, 14s an radio base station disposed in a special place such as the vicinity of the entrance and the exit of a museum, and 15 a base station controller for controlling the radio base stations. The symbols RZa to Rzs represent radio zones of the respective radio base stations 14a to 14s. Each portable terminal unit and the base station controller have the same structures as those shown in FIGS. 17 and 19, respectively.

A specific radio base station 14s for preventing a borrower of a portable terminal unit from returning it is disposed in a special place such as the entrance and the exit of the museum, and a specific radio signal is transmitted from the radio base station 14s. Each of the portable terminal units 13a to 13s detects that it has entered the radio zone RZs which is controlled by the radio base station 14s when the portable terminal unit receives the specific radio signal. If the portable terminal unit 13s detects that it has entered the radio zone RZs, the portable terminal unit 13s operates the warning device 148 (FIG. 17) provided within the portable terminal unit 13s so as to output the message for preventing a borrower of a portable terminal unit from returning it in a speech sound, or sounds an alarm.

Figure 23:
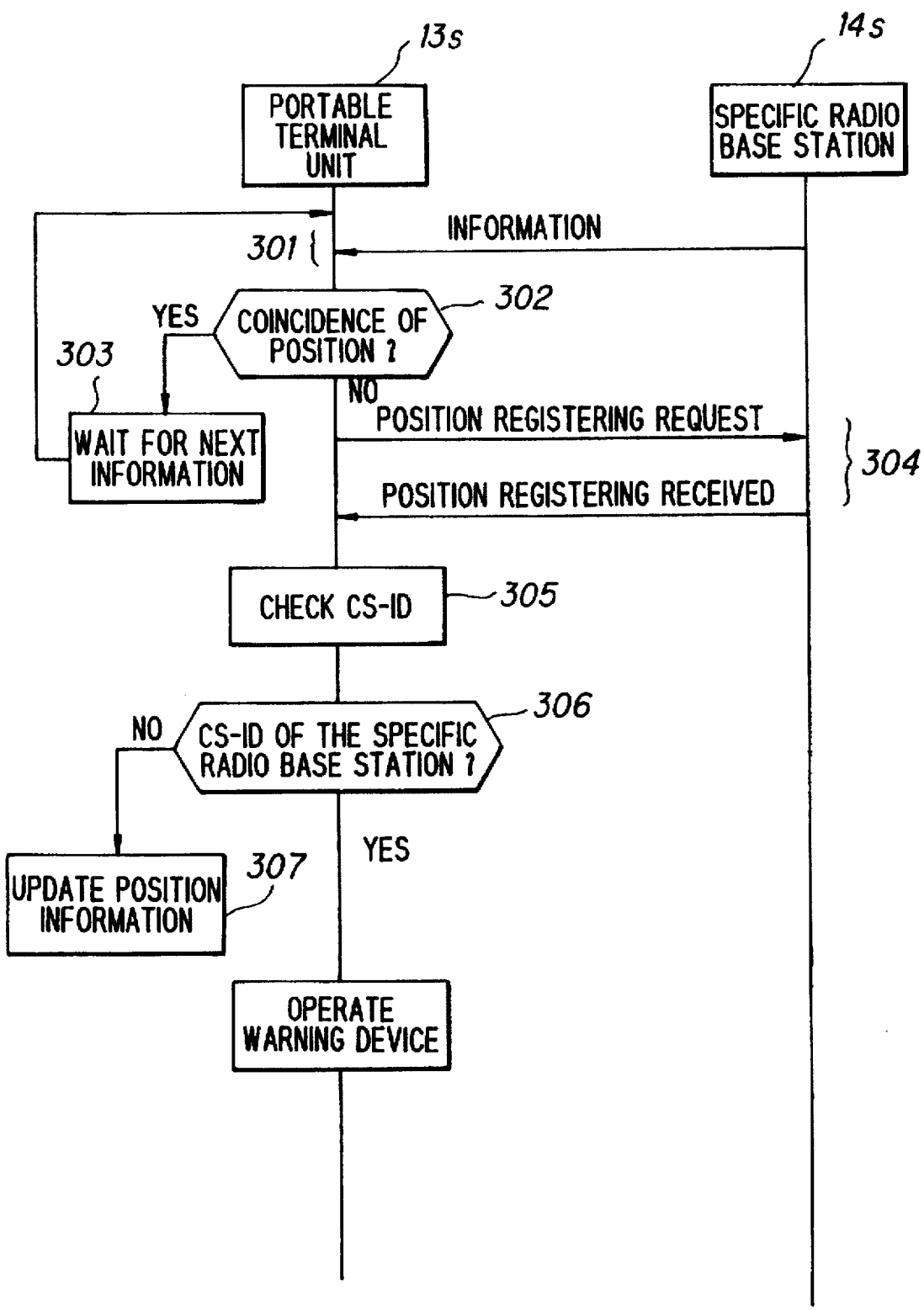
FIG. 23 is an explanatory view of the process of preventing a borrower of a portable terminal unit from forgetting to return it in the second embodiment.

FIG. 23 is an explanatory view of the process of preventing a borrower of a portable terminal unit from forgetting to return it in the second embodiment. The identification code CS-ID of the radio base station 14s which is contained in the information and which is different from the identification codes of the other radio base stations provided within the museum is stored in the storage portion 146 (FIG. 17) of each portable terminal unit in advance.

When the portable terminal unit 13s receives information, it judges whether or not the position information contained in the information is coincident with the latest received position information (step 302). If the answer is in the affirmative, the portable terminal unit 13 waits for the next information (step 303). If the answer is in the negative, since it means that the portable terminal unit 13s has been moved to another area (radio zone), the portable terminal unit 13s transmits a position registering request signal to the radio base station and receives a position registering reception signal (step 304). The portable terminal unit 13s then compares the identification code CS-ID contained in the received information with the identification code CS-ID stored in the storage portion 146 (steps 305, 306). If they do not agree, in other words, if the identification code CS-ID contained in the received information is not the identification code CS-ID of the radio base station 14s outside of the museum, the portable terminal unit 13s updates the position information in the storage portion 146 (step 307). On the other hand, if they agree, in other words, if the identification code CS-ID contained in the received information is the identification code CS-ID of the radio base station 14s outside of the museum, the portable terminal unit 13s operates the warning device 148 (FIG. 17) provided therewithin so as to output the message for preventing a borrower of a portable terminal unit from returning it in a speech sound, or sounds an alarm.

According to this structure, if a portable terminal unit enters the radio zone RZs, since the warning device provided therewithin is automatically driven, it is possible to prevent the borrower of the portable terminal unit from forgetting to return it.

(c) Third embodiment

Figure 24:
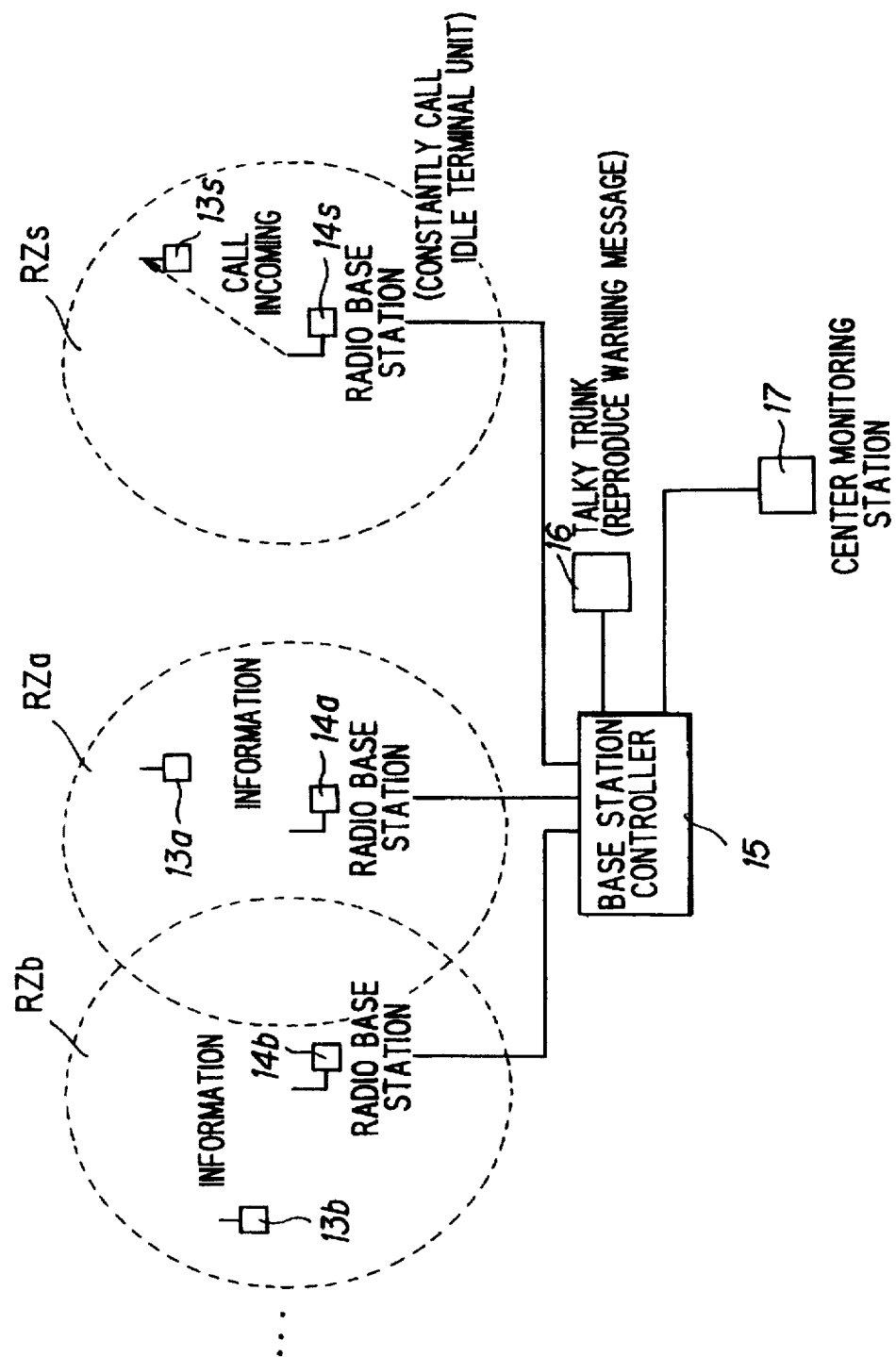
FIG. 24 is a schematic explanatory view of a third embodiment of a method of preventing a borrower of a portable terminal unit from forgetting to return it according to the present invention.

FIG. 24 is an explanatory view of a third embodiment of a method of preventing a borrower of a portable terminal unit from returning it according to the present invention. In FIG. 24, the reference numerals 13a, 13b and 13s represent portable terminal units, 14a and 14b radio base stations for guiding provided within a museum such as an art museum, 14s an radio base stations disposed in a special place such as the vicinity of the entrance and the exit of a museum, 15 a base station controller for controlling the radio base stations, 16 a talky trunk for outputting a message which prevents a borrower of a portable terminal unit from forgetting to return it, and 17 a center monitoring station which notifies that the a portable terminal unit has been carried out of the museum by sounding an alarm and which displays the number of the portable terminal unit. Each portable terminal unit, the base station controller 15 and the center monitoring station 17 have the same structures as those shown in FIGS. 17, 19 and 20, respectively.

The base station controller 15 monitors the state of each portable terminal unit so as to judge whether or not it is busy, and calls a portable terminal unit with a ring which is not busy via the radio base station 14s disposed in the vicinity of the entrance and the exit of the museum. When the portable terminal unit 13s which is called returns an off-hook response, the base station controller 15 connects the portable terminal unit 13s with the talky trunk 16 and transmits the message for preventing a borrower of a portable terminal unit from returning it to the portable terminal unit 13s. The portable terminal unit 13s output the received message in a speech sound. On the other hand, when the portable terminal unit 13s which is called up returns a call-incoming response, the base station controller 15 judges that the portable terminal unit 13s exists in the radio zone RZs and notifies the center monitoring station 17 that the portable terminal unit 13s has been carried out of the museum.

Figure 25:
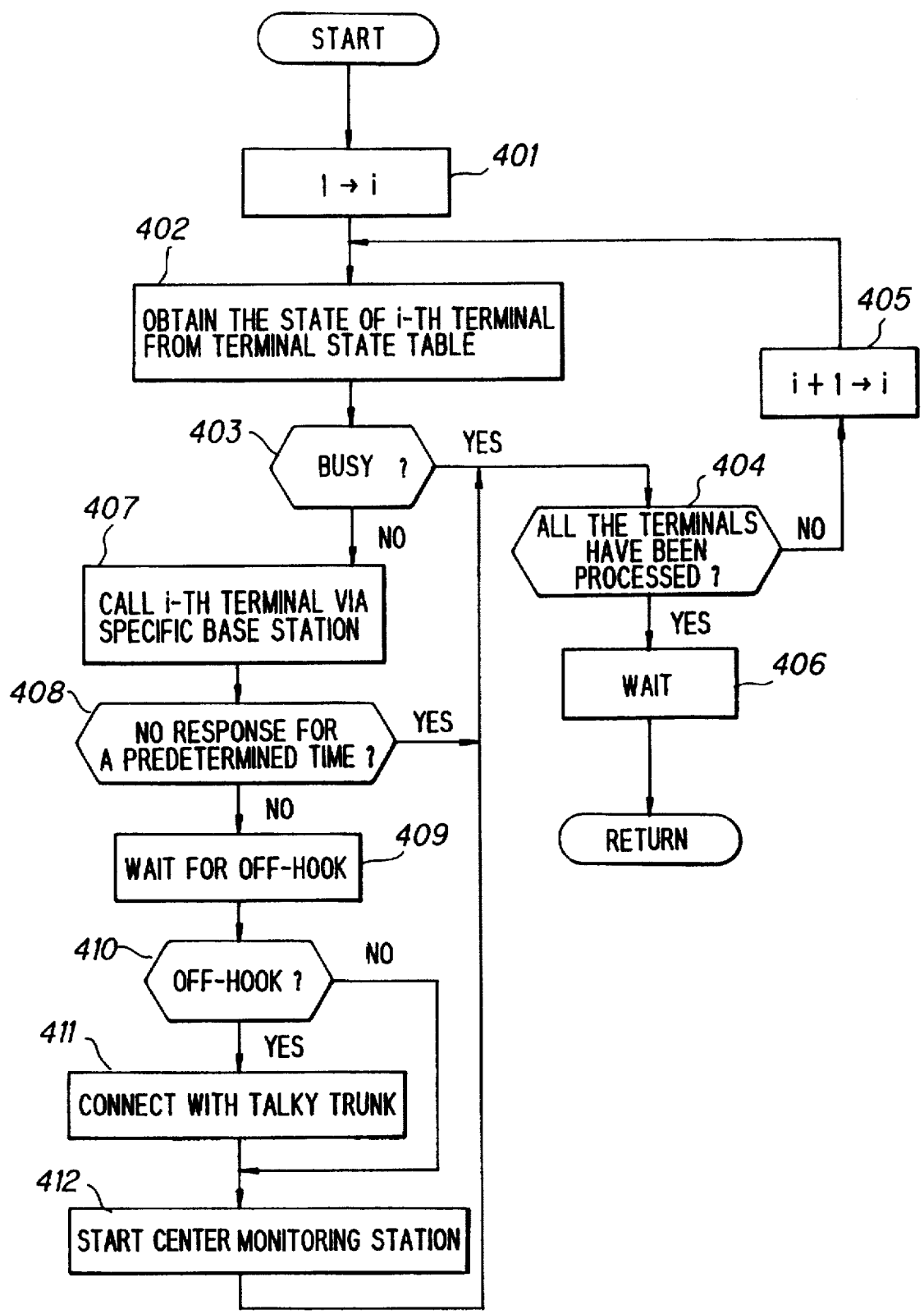
FIG. 25 is a flow chart of the process of preventing a borrower of a portable terminal unit from forgetting to return it in the third embodiment.

FIG. 25 is a flow chart of the process of preventing a borrower of a portable terminal unit from forgetting to return it in the third embodiment.

The control unit 153 (FIG. 19) of the base station controller 15 first sets 1 to i (step 401) and obtains the state (busy/idle) of an i-th portable terminal unit from the terminal state table TCT (step 402). Judgement is then made as to whether or not the i-th portable terminal unit is busy (step 403), and if the answer is YES, judgement is made as to whether or not the process has been finished for all the portable terminal units (step 404). If the answer is YES, 1 is added to i (i+1→i, step 405), and the processing at the step 402 and thereafter is repeated. If the answer is NO at the step 404, the control units 153 waits for a predetermined time (step 406). The process then returns to the start and the subsequent processing is repeated.

On the other hand, if the i-th portable terminal unit is idle at the step 403, the control unit 153 calls the i-th portable terminal unit with a ring via the radio base station 14s (step 407).

If the i-th portable terminal unit exists in the radio zone RZs of the radio base station 14s, the portable terminal unit receives the message and executes a control sequence at the time of call incoming. In the execution of the control sequence, the portable terminal unit transmits a call incoming message to the base station controller 15. However, if the i-th portable terminal unit does not exist in the radio zone RZs, in other words, if the i-th portable terminal unit exists within the museum, the portable terminal unit cannot receive the message from the base station controller 15 or return a call incoming message to the base station controller 15.

Therefore, the control unit 153 waits for a call-incoming response for a predetermined time after calling (step 408) and if there is no call-incoming response, it judges that the portable terminal unit exists within the museum and executes the processing at the step 404 without taking any measure for preventing a borrower of a portable terminal unit from returning it. On the other hand, if there is a call-incoming response from the portable terminal unit, the portable terminal unit outputs a ringing tone in the execution of the sequence at the time of call incoming. The base station controller 15 waits for an off-hook response (steps 409, 410), and if there is an off-hook response within a predetermined time, the base station controller 15 starts an announce device and connects the talky trunk 16 with the i-th portable terminal unit 13s, whereby the message for preventing a borrower of a portable terminal unit from returning it is transmitted to the portable terminal unit 13s. The portable terminal unit 13s receives the message and outputs it in a speech sound from the warning device 148 (FIG. 17) (step 411). Thereafter, or if there is no off-hook response at the step 410, the base station controller 15 calls the center monitoring station 17 and supplies the terminal number (step 412). When the center monitoring station 17 receives the terminal number, it displays the received terminal number on the display unit 173 (FIG. 20) and causes the alarm unit 174 to sound an alarm indicating that a terminal unit has been carried out of the museum. Thereafter, the base station controller 15 executes the processing at the step 404.

According to this structure, since the portable terminal unit existing in the radio zone RZs at the entrance or the exit of the museum, which is outside of the museum, does not fail to ring and output a warning message in a speech sound when an off-hook response is returned, and furthermore, since a warning is supplied to the center monitoring station at such a time, it is possible to prevent the borrower from forgetting to return it.

In this embodiment, the portable terminal unit which is not busy is called with a ring under the control of the base station controller 15. Alternatively, the radio base station 14s disposed in the vicinity of the entrance or the exit may refer to the base station controller 15 for the state of a portable terminal unit and call the portable terminal unit with a ring which is idle.

(d) Fourth embodiment

Figure 26:
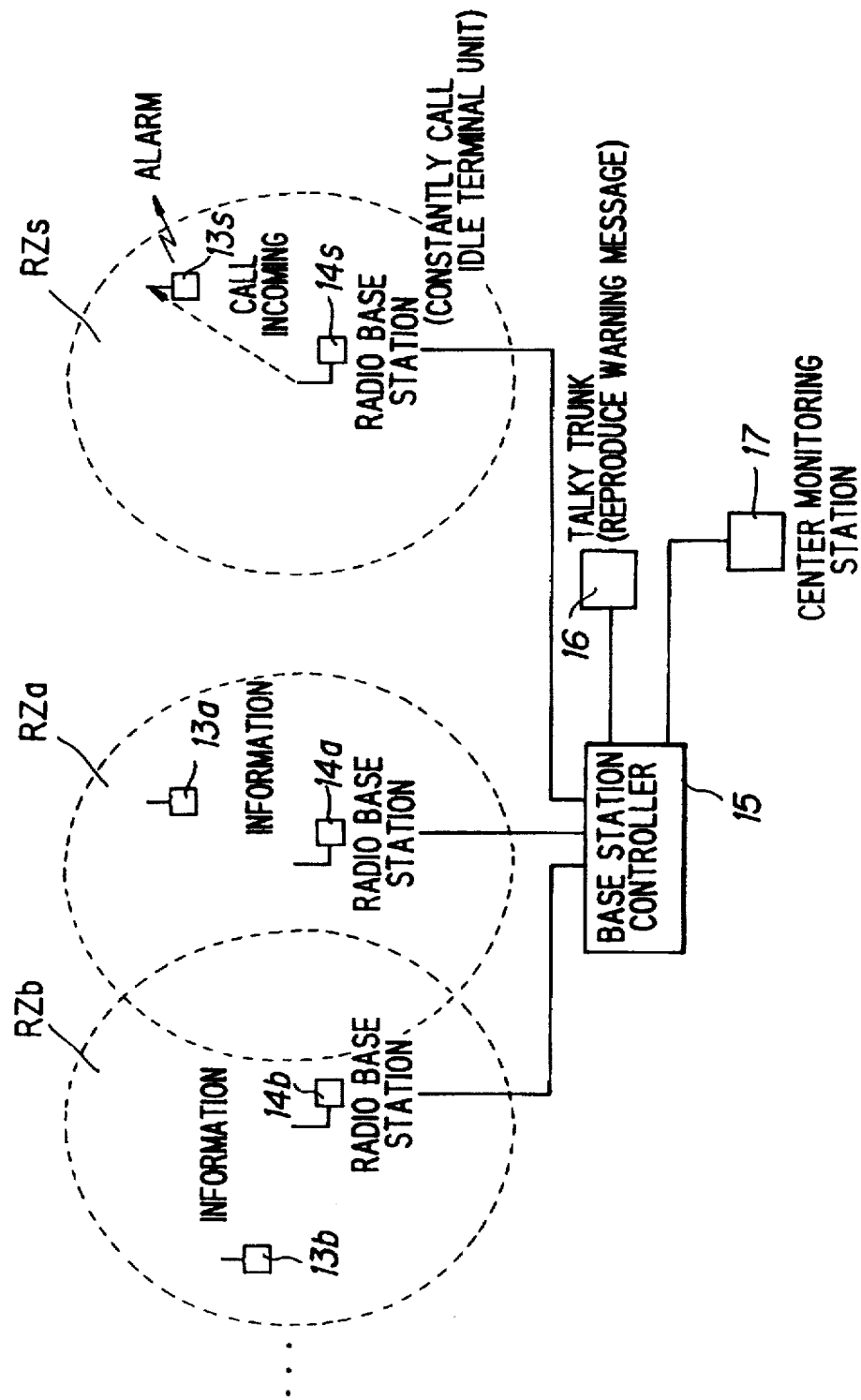
FIG. 26 is a schematic explanatory view of a fourth embodiment of a method of preventing a borrower of a portable terminal unit forgetting to return it according to the present invention.

FIG. 26 is an explanatory view of a fourth embodiment of a method of preventing a borrower of a portable terminal unit from returning it according to the present invention. In FIG. 26, the reference numerals 13a, 13b and 13s represent portable terminal units, 14a and 14b radio base stations for guiding provided within a museum such as an art museum, 14s an radio base station disposed in a special place such as the vicinity of the entrance and the exit of a museum, 15 a base station controller for controlling the radio base stations, 16 a talky trunk for outputting a message which prevents a borrower of a portable terminal unit from forgetting to return it, and 17 a center monitoring station which notifies that the a portable terminal unit has been carried out of the museum by sounding an alarm and which displays the number of the portable terminal unit. Each portable terminal unit, the base station controller 15 and the center monitoring station 17 have the same structures as those shown in FIGS. 17, 19 and 20, respectively.

Figure 27:
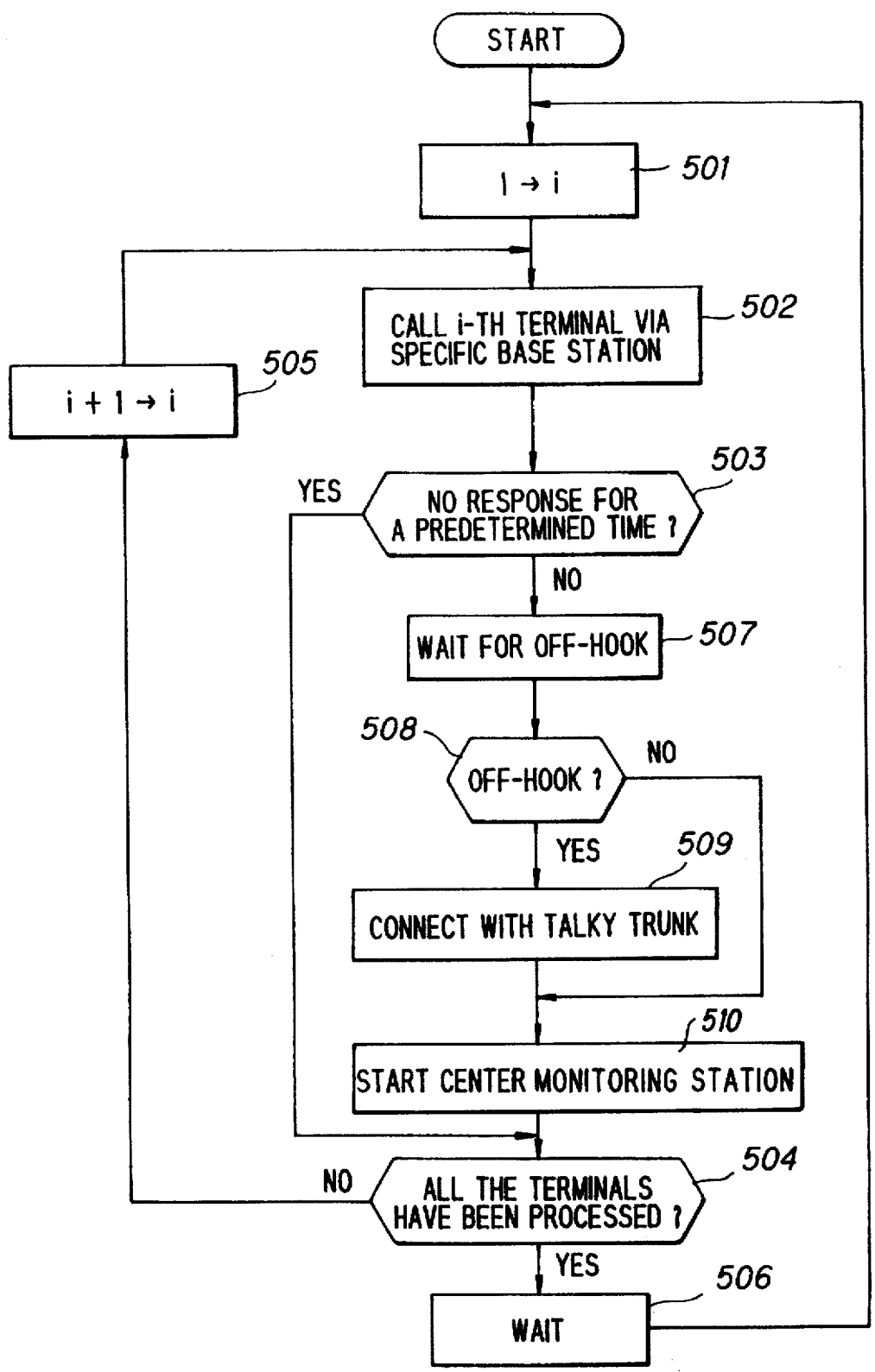
FIG. 27 is a flow chart of the process of preventing a borrower of a portable terminal unit from forgetting to return it in the fourth embodiment.

FIG. 27 is a flow chart of the process of preventing a borrower of a portable terminal unit from forgetting to return it in the fourth embodiment.

The control unit 153 (FIG. 19) of the base station controller 15 first sets 1 to i (step 501) and calls the i-th portable terminal unit with a ring via the specific radio base station 14s (step 502). If the i-th portable terminal unit exists in the radio zone RZs of the radio base station 14s, the portable terminal unit receives the message and executes a control sequence at the time of call incoming. In the execution of the control sequence, the portable terminal unit transmits a call incoming message to the base station controller 15. However, if the i-th portable terminal unit does not exist in the RZs, in other words, if the i-th portable terminal unit exists within the museum, the portable terminal unit cannot receive the message from the base station controller 15 or return a call incoming message.

Therefore, the control unit 153 waits for a call-incoming response for a predetermined time after calling (step 503) and if there is no call-incoming response, it judges that the portable terminal unit exists within the museum and takes no measure for preventing a borrower of a portable terminal unit from returning it. The control unit 153 judges whether or not the process has been finished for all the portable terminal units (step 504). If the answer is YES, 1 is added to i (i+1→i, step 505), and the processing at the step 502 and thereafter is repeated. If the answer is NO at the step 504, the control unit 153 waits for a predetermined time (step 506). The process then returns to the start and the subsequent processing is repeated.

On the other hand, if there is a call-incoming response from the i-th portable terminal unit (the i-th portable terminal unit exists in the radio zone RZs) at the step 503, the portable terminal unit outputs a ringing tone in the execution of the sequence at the time of call incoming. The base station controller 15 waits for an off-hook response (steps 507, 508), and if there is an off-hook response within a predetermined time, the base station controller 15 starts an announce device and connects the talky trunk 16 with the i-th portable terminal unit 13s, whereby the message for preventing a borrower of a portable terminal unit from returning it is transmitted to the portable terminal unit 13s. The portable terminal unit 13s receives the message and outputs it in a speech sound from the warning device 148 (FIG. 17) (step 509).

Thereafter, or if there is no off-hook response at the step 508, the base station controller 15 calls the center monitoring station 17 and supplies the terminal number (step 510).

When the center monitoring station 17 receives the terminal number, it displays the received terminal number on the display unit 173 (FIG. 20) and causes the alarm unit 174 to sound an alarm indicating that a terminal unit has been carried out of the museum. Thereafter, the base station controller 15 executes the processing at the step 504.

According to this structure, the portable terminal unit existing in the radio zone RZs at the entrance or the exit of the museum does not fail to ring and output a warning message in a speech sound when an off-hook response is returned. Furthermore, since a warning is supplied to the center monitoring station at such a time, it is possible to prevent the borrower from forgetting to return it.

(e) Fifth embodiment

Figure 28:
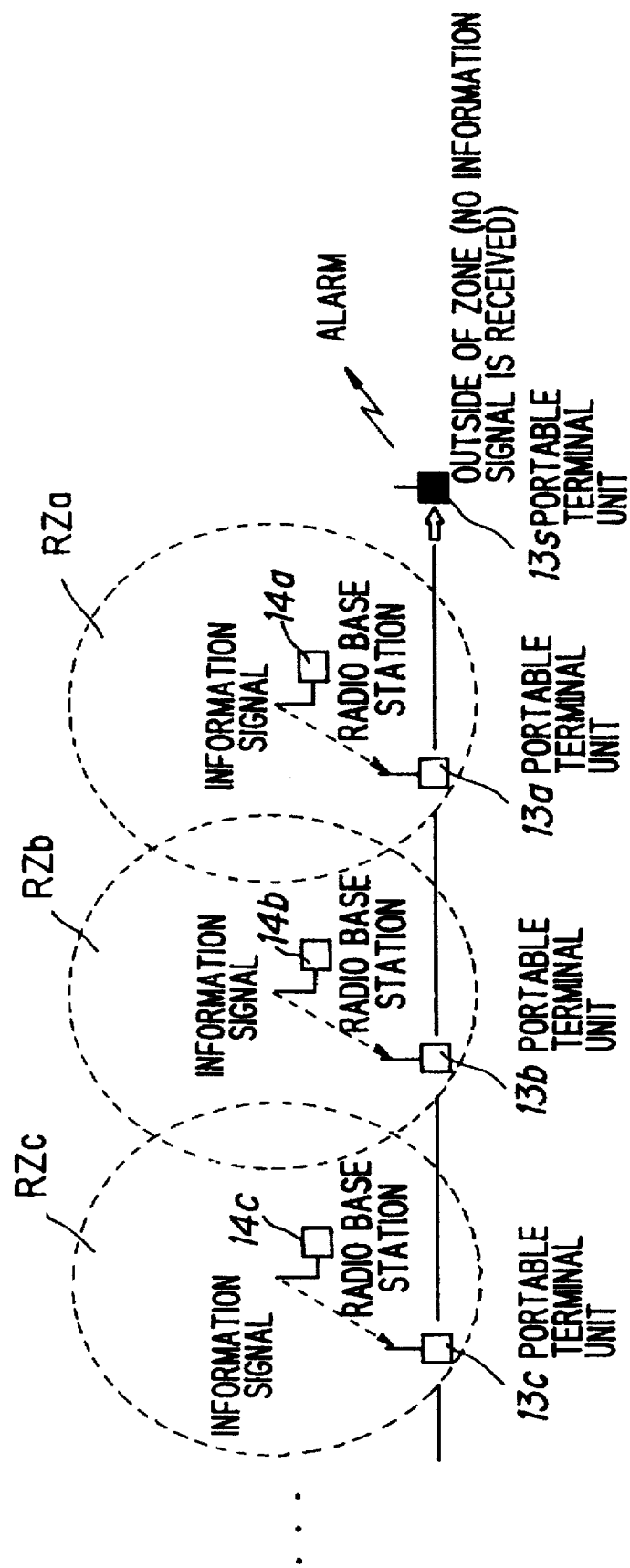
FIG. 28 is a schematic explanatory view of a fifth embodiment of a method of preventing a borrower of a portable terminal unit from forgetting to return it according to the present invention.

FIG. 28 is an explanatory view of a fifth embodiment of a method of preventing a borrower of a portable terminal unit from returning it according to the present invention. In FIG. 28, the reference numerals 13$a$, 13$b$ and 13$c$ represent portable terminal units, 14$a$, 14$b$ and 14$c$ radio base stations for guiding provided within a museum such as an art museum and 13$s$ a portable terminal unit carried out of the museum. The symbols RZa to RZc represent radio zones (radio wave propagation ranges) of the respective radio base stations 14$a$ to 14$c$.

Each portable terminal unit judges whether or not it has received information from any given radio base station (14$a$ to 14$c$), and if no information signal is received from any radio base station, the portable terminal unit judges that it has been carried out of the museum and operates the warning device 148 (FIG. 17) to output an message for preventing a borrower of a portable terminal unit from returning it.

Figure 29:
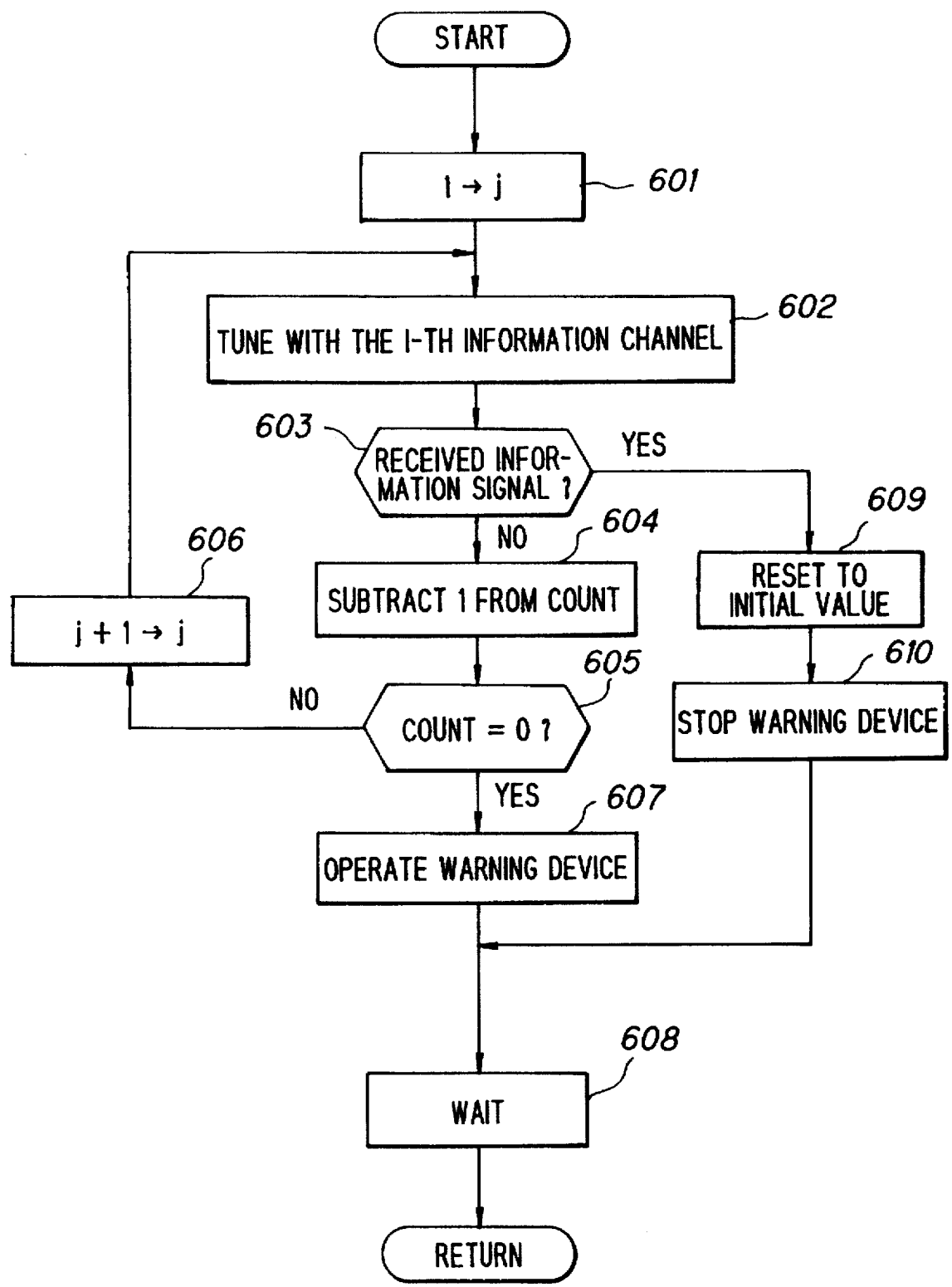
FIG. 29 is a flow chart of the process of preventing a borrower of a portable terminal unit from forgetting to return it in the fifth embodiment.

FIG. 29 is a flow chart of the process of preventing a borrower of a portable terminal unit from forgetting to return it in the fifth embodiment.

A portable terminal unit first sets 1 to j (step 601) and tunes with the information channel of the j-th radio base station (step 602). In this state, the portable terminal unit judges whether or not it has received information from any given radio base station (step 603), and if the answer is in the negative, 1 is subtracted from the count (the initial value is equivalent to the number n of radio base stations) of a counter (step 604), and judgement is made as to whether or not the count reaches 0 (step 605). If the count is not 0, 1 is added to j (step 606), and the process returns to the step 602 so as to tune with the next information channel and repeat the subsequent processing. If the count is 0 at the step 605, in other words, if no information is received from any radio base station, the portable terminal unit judges that it has been carried out of the museum and operates the warning device 148 to output a message for preventing a borrower of a portable terminal unit from returning it (step 607). After the portable terminal unit waits for a predetermined time (step 608), the process returns to the start and the subsequent processing is repeated.

On the other hand, if an information signal is received at the step 603, it means that the portable terminal unit exists within the museum, so that the count of the counter is reset to the initial value n (step 609), and if the warning device 148 is operating, the warning device 148 is stopped (step 610). After the portable terminal unit waits for a predetermined time (step 608), the process returns to the start and the subsequent processing is repeated.

According to this embodiment, since a message for warning is output when a portable terminal unit is judged to have been carried out of the museum, it is possible to prevent the borrower of the portable terminal unit from forgetting to return it. In addition, in the fifth embodiment, it is not necessary to provide a specific radio base station outside of the museum.

(f) Sixth embodiment

Figure 30:
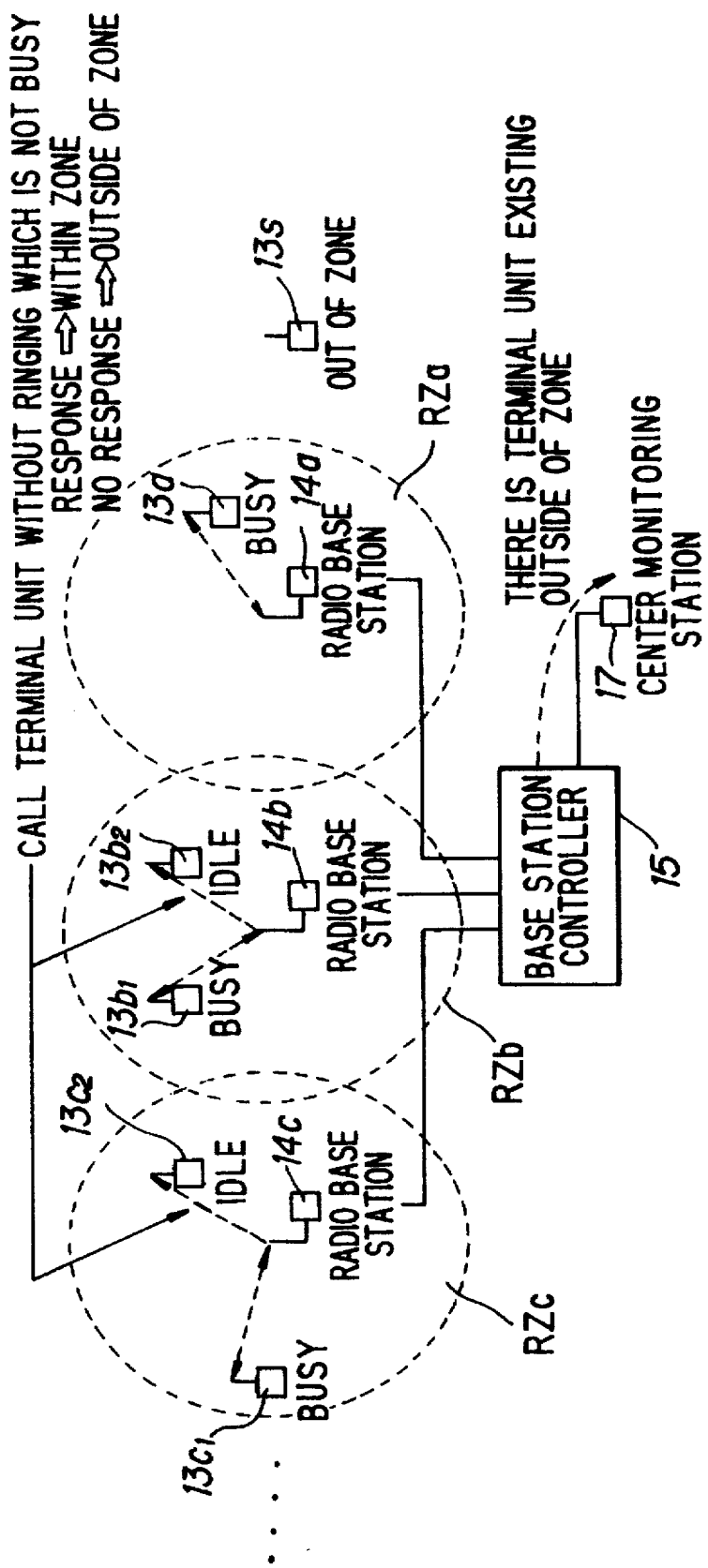
FIG. 30 is a schematic explanatory view of a sixth embodiment of a method of preventing a borrower of a portable terminal unit from forgetting to return it according to the present invention.

FIG. 30 is an explanatory view of a sixth embodiment of a method of preventing a borrower of a portable terminal unit from returning it according to the present invention. In FIG. 30, the reference numerals 13$a$, 13$b_1$, 13$b_2$, 13$c_1$ and 13$c_2$ represent portable terminal units, 14$a$, 14$b$ and 14$c$ radio base stations for guiding provided within a museum such as an art museum, 13$s$ a portable terminal unit carried out of the museum, 15 a base station controller, and 17 a center monitoring station. The symbols RZa to RZc represent radio zones (radio wave propagation ranges) of the respective radio base stations 14$a$ to 14$c$.

The base station controller 15 monitors the state of each portable terminal unit so as to judge whether or not it is busy, and calls the portable terminal unit 13$s$ without ringing which is not busy via all radio base stations 14$a$ to 14$c$ within the museum. When there is no call incoming from the portable terminal unit 13$s$ which is called, the base station controller 15 judges that the portable terminal unit is outside of all the radio zones, in other words, outside of the museum, and informs the center monitoring station 17 that the portable terminal unit 13$s$ has been carried out of the museum.

Figure 31:
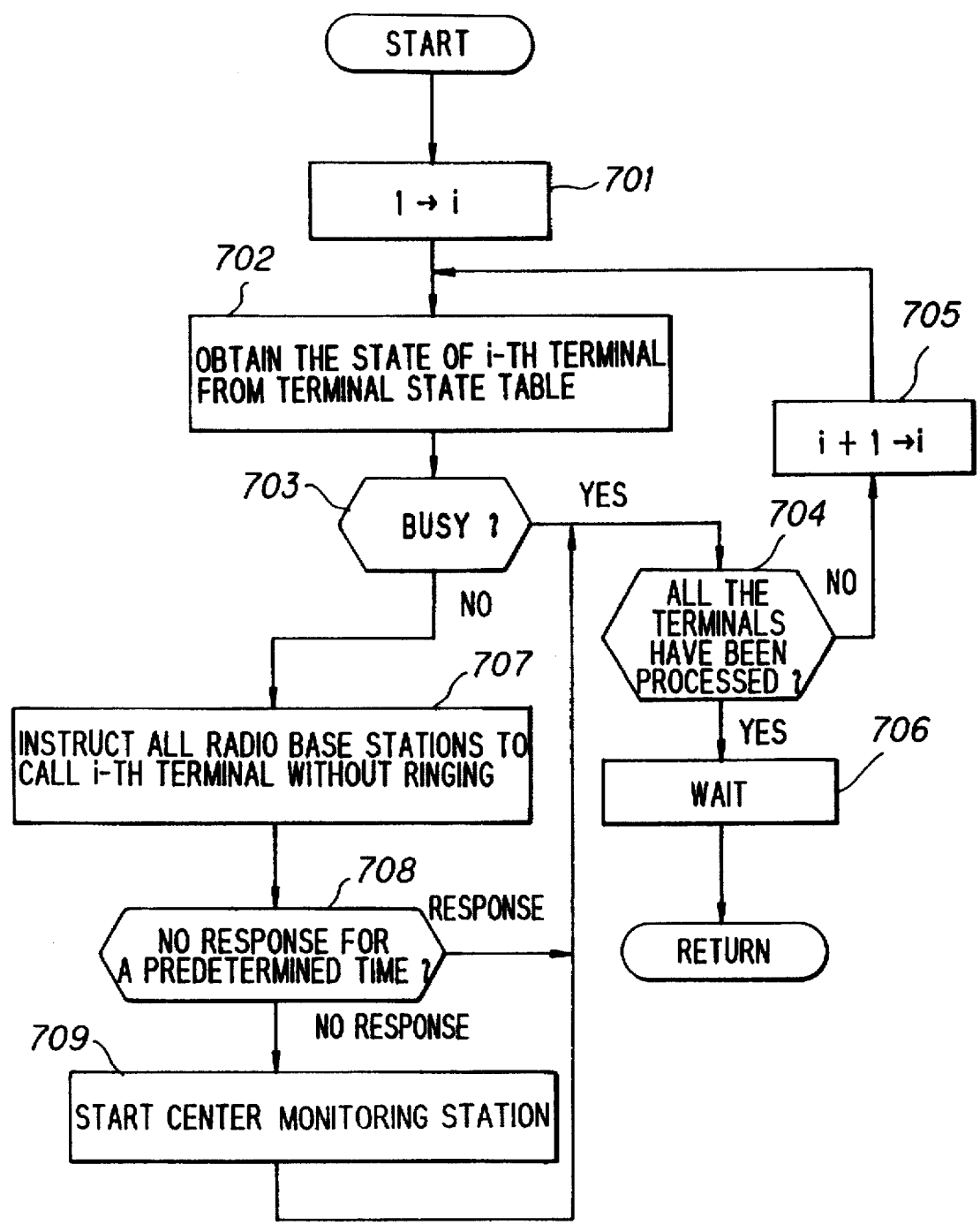
FIG. 31 is a flow chart of the process of the base station controller in the sixth embodiment.

FIG. 31 is a flow chart of the process of preventing a borrower of a portable terminal unit from forgetting to return it in the sixth embodiment.

The control unit 153 (FIG. 19) of the base station controller 15 first sets 1 to i (step 701) and obtains the state (busy/idle) of an i-th portable terminal unit from the terminal state table TCT (step 702). Judgement is then made as to whether or not the i-th portable terminal unit is busy (step 703), and if the answer is YES, judgement is made as to whether or not the process has been finished for all the portable terminal units (step 704). If the answer is in the negative, 1 is added to i (i+1→i, step 705), and the processing at the step 702 and thereafter is repeated. If the answer is in the affirmative at the step 704, the control units 153 waits for a predetermined time (step 706). The process then returns to the start and the subsequent processing is repeated.

On the other hand, if the i-th portable terminal unit is idle at the step 703, the control unit 153 instructs all the radio base stations 14$a$ to 14$c$ to call the i-th portable terminal unit without ringing, so that the portable terminal unit is called without ringing from all radio base stations 14$a$ to 14$c$ simultaneously (step 707).

If the i-th portable terminal unit exists in one of the radio zones RZa to RZc of the radio base stations 14$a$ to 14$c$, the portable terminal unit receives the message and executes a control sequence at the time of call incoming. In the execution of the control sequence, the portable terminal unit transmits a call incoming message to the base station controller 15. However, if the i-th portable terminal unit does not exist in any of the radio zones Rza to RZc, in other words, if the i-th portable terminal unit exists outside of the museum, the portable terminal unit cannot receive the message from the base station controller 15 or return a call incoming message to the base station controller 15.

Therefore, the control unit 153 waits for a call-incoming response for a predetermined time after calling (step 708) and if there is a call-incoming response, it judges that the portable terminal unit exists within the museum and executes the processing at the step 704 without taking any measure for preventing a borrower of a portable terminal unit from returning it. On the other hand, if there is no call-incoming response from the portable terminal unit, the base station controller 15 judges that the portable terminal unit is outside of the museum and calls the center monitoring station 17 so as to supply the terminal number (step 709).

When the center monitoring station 17 receives the terminal number, it displays the received terminal number on the display unit 173 (FIG. 20) and causes the alarm unit 174 to sound an alarm indicating that a portable terminal unit has been carried out. Thereafter, the base station controller 15 executes the processing at the step 704.

Figure 32:
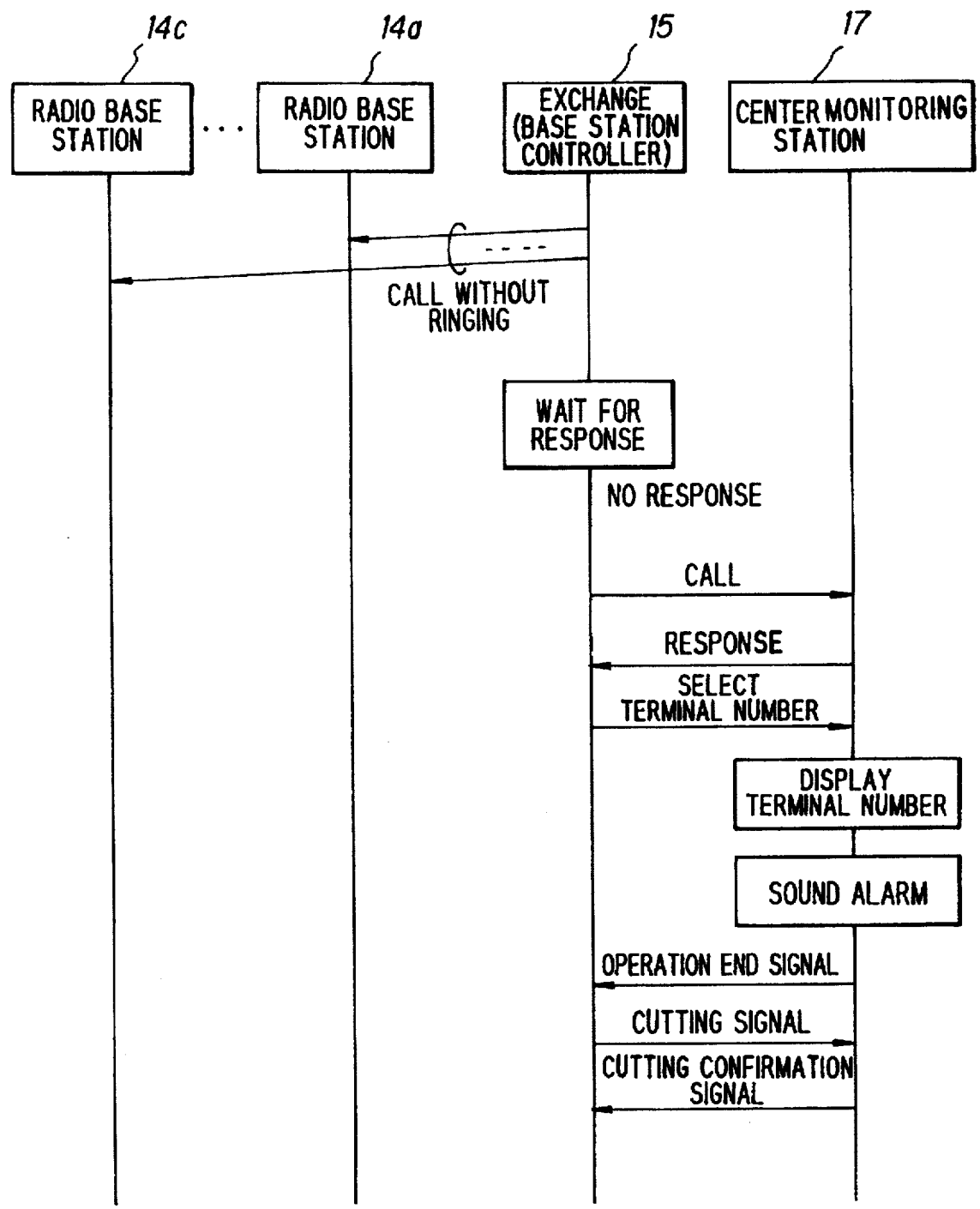
FIG. 32 is an explanatory view of the process of preventing a borrower of a portable terminal unit from forgetting to return it in the sixth embodiment.
Figure 33:
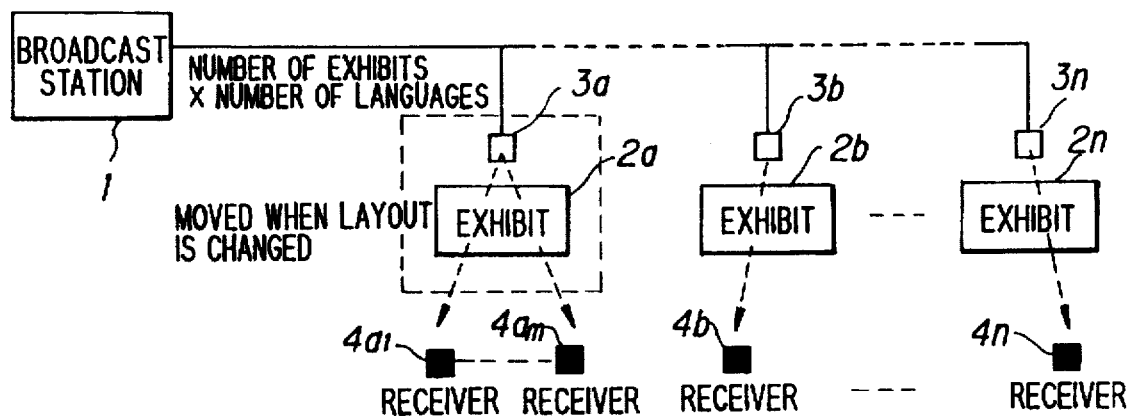
FIG. 33 shows the structure of a conventional information guiding system (broadcast system)
Figure 34:
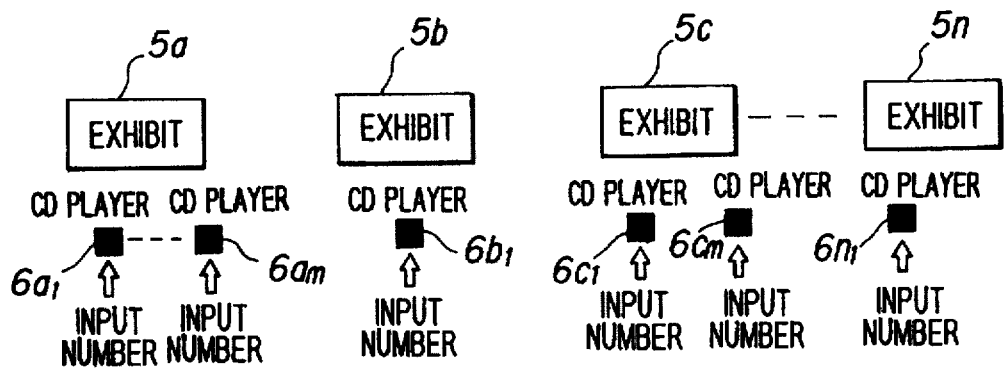
FIG. 34 shows the structure of another conventional information guiding system (CD player system).

FIG. 32 is an explanatory view of the process of control by the base station controller 15, each of the radio base stations 14a to 14c and the center monitoring station 17 in the sixth embodiment.

According to this structure, since the base station controller 15 detects a portable terminal unit which has been carried out of the museum and informs the center monitoring station 17 of the fact, it is possible to prevent the borrower of the portable terminal unit from forgetting to return it. In addition, in the sixth embodiment, it is not necessary to provide a specific radio base station outside of the museum.

As described above, according to the present invention, since the communication line is established individually for each portable terminal unit, each visitor can individually listen to the information about an exhibit from the beginning. In addition, it is possible to reduce the size and the weight of the portable terminal unit so as to be convenient for carrying.

The portable terminal unit receives the feeble signal transmitted from the feeble signal transmitter, identifies the number of the exhibit, and transmits the number of the exhibit to the audio response equipment as the audio file designating information. In this manner, since there is no need to input the number for identifying each exhibit through a key, the visitor can automatically listen to the explanation of the desired exhibit merely by starting the portable terminal unit, which enhances the operability. In addition, since the feeble signal transmitter transmits a feeble signal intermittently, it is possible to reduce the power consumed by the feeble signal transmitter.

According to the present invention, the audio response equipment is provided with (1) audio files in a plurality of languages for each exhibit, (2) a plurality of audio files corresponding to the respective information depths (degree of detailedness such as detailed explanation and schematic explanation) for each exhibit, or (3) a plurality of audio files in a plurality of languages corresponding to the respective information depths for each exhibit. The portable terminal unit transmits (1) the number of the exhibit and the selected language, (2) the number of the exhibit and the selected information depth, or (3) the number of the exhibit, the selected language and the selected information depth to the audio response equipment, and the audio response equipment reads and outputs the audio information from the audio file which corresponds to the audio file designating information. In this manner, it is conveniently possible to listen to the explanation of the exhibit in a desired language with a desired degree of detailedness.

In addition, since the portable terminal unit is provided with function keys which start call processing, service number dialling processing, processing of receiving the feeble signal transmitted from the feeble signal transmitter, and processing of transmitting the audio file designating information by one-touch operation, it is possible to receive the explanation of an exhibit merely by operating a function key, thereby enhancing the operability. When a function key is operated while the carrier is listening to the explanation of the exhibit, only the processing of receiving the feeble signal and the processing of transmitting the audio file designating information are executed and neither the call processing nor the service number dialling processing is executed. In this manner, it is possible to immediately listen to another piece of audio information consecutively through the established communication line without cutting the communication line.

According to the present invention, it is also possible to transmit information (the number of the exhibit, the language and the information depth) for designating an audio file through the control channel as control information. In this case, it is not necessary to provide an MF oscillator and a control mechanism therefor in a portable terminal unit, thereby simplifying the structure of the portable terminal unit.

If the information (the number of the exhibit, the language and the information depth) for designating an audio file is transmitted as control information at the same time with call setting, it is possible to listen to the explanation of an exhibit in a shorter time.

According to the present invention, a specific radio base station for preventing a borrower of a portable terminal unit from returning it is disposed in a special place such as the entrance and the exit of a museum, and a specific radio signal is transmitted from the radio base station. Each portable terminal unit detects that it has entered the specific radio zone which is controlled by the radio base station when the portable terminal unit receives the specific radio signal. The portable terminal unit existing in the radio zone informs the base station controller that the portable terminal unit has entered the specific radio zone via the radio base station, and the base station controller takes measures to prevent the borrower from forgetting to return the portable terminal unit. It is thus possible to prevent the borrower of the portable terminal unit from forgetting to return it.

In addition, when a portable terminal unit is informed that it has entered the specific radio zone outside of the museum, it outputs a warning message in a audible sound. Alternatively, when the center monitoring station is informed that a portable terminal unit has entered the specific radio zone, the center monitoring station notifies that the portable terminal unit has been carried out of the museum. In this way, it is possible to securely prevent the borrower of the portable terminal unit from forgetting to return it.

According to the present invention, a specific radio base station for preventing a borrower of a portable terminal unit from returning it is disposed in a special place such as the entrance and the exit of a museum, and a specific radio signal is transmitted from the radio base station. Each portable terminal unit detects that it has entered the specific radio zone which is controlled by the radio base station when the portable terminal unit receives the specific radio signal. Since the portable terminal unit which has entered the specific radio zone operates the alarm unit provided therein so as to sound an alarm, it is possible to prevent the borrower of the portable terminal unit from forgetting to return it.

According to the present invention, a specific radio base station is disposed in a specific place such as the entrance or the exit of a museum, and the base station controller monitors the state of each portable terminal unit so as to judge whether or not it is busy, and calls the portable terminal unit with a ring which is not busy via the specific radio base station. If there is an off-hook response, the base station controller outputs a warning message from the portable terminal unit in a speech sound, or notifies the center monitoring station that the portable terminal unit has been carried out of the museum. It is thus possible to prevent the borrower of the portable terminal unit from forgetting to return it.

Furthermore, according to the present invention, a specific radio base station for preventing a borrower of a portable terminal unit from returning it is disposed in a specific place such as the entrance or the exit of a museum, and the base station controller calls all the portable terminal units with a ring via the specific radio base station. When a portable terminal unit returns an off-hook response, the base station controller outputs a warning message from the portable terminal unit in a speech sound. It is thus possible to prevent the borrower of the portable terminal unit from forgetting to return it.

According to the present invention, a portable terminal unit judges whether or not a signal is received from any given radio base station, and if no signal is received from any radio base station, the portable terminal unit operates the alarm unit provided therein so as to sound an alarm. It is thus possible to prevent a borrower of a portable terminal unit from forgetting to return it without the need for providing a specific radio base station in the vicinity of the entrance or the exit of a museum.

In addition, according to the present invention, since the base station controller monitors each portable terminal unit to judge whether or not it is busy, and simultaneously calls the portable terminal unit without ringing which is not busy via all the radio base stations. If there is no call-incoming response from the portable terminal unit, the base station controller judges that the portable terminal unit exists outside of all the radio zones, and notifies the center monitoring station that the portable terminal unit has been carried out of the museum. It is thus possible to prevent a borrower of a portable terminal unit from forgetting to return it without the need for providing a specific radio base station in the vicinity of the entrance or the exit of a museum.

As many apparently widely different embodiments of the present invention can be made without departing from the spirit and scope thereof, it is to be understood that the invention is not limited to the specific embodiment thereof except as defined in the appended claims.

What is claimed is:

1. An information guiding system comprising:

an audio response equipment for storing a multiplicity of audio files so as to provide information about the exhibits for visitors in a speech sound and taking out the information about an exhibit from an audio file designated by audio file designating information and outputting said information in audible sound signals;

a cordless portable terminal unit which is carried by a visitor;

a radio base station for controlling the connection between a radio circuit for said portable terminal unit and a wire circuit for an exchange; and said exchange for controlling the connection between said radio base station and said audio response equipment;

wherein said portable terminal unit transmits a service number for guiding to said radio base station so as to request said radio base station to set a call to said audio response equipment;

said radio base station transmits a call setting request to said exchange through said wire circuit when said radio base station receives said service number from said portable terminal unit;

said exchange sets an speech path to said audio response equipment on the basis of said call setting request;

said portable terminal unit transmits said audio file designating information to said audio response equipment via said radio base station, said exchange and said speech path; and said audio response equipment takes out said audio information with respect to said exhibit from said audio file designated by said audio file designating information, converts said audio information into audible sound signals and transmits said audible sound signals to said speech path so that it is transferred via said exchange and said radio base station to said portable terminal unit which has called said audio response equipment.

2. An information guiding system according to claim 1, further comprising a feeble signal transmitter disposed in the vicinity of each of said exhibits so as to transmit a feeble signal indicating the number of an exhibit, wherein said portable terminal unit receives said feeble signal, identifies the number of the corresponding exhibit, and supplies said number of the exhibit as said audio file designating information.

3. An information guiding system according to claim 2, wherein said feeble signal transmitter transmits said feeble signal intermittently.

4. An information guiding system according to claim 1, wherein said audio response equipment stores audio files of a plurality of languages for each of said exhibits;

said portable terminal unit supplies the number of an exhibit and a selected language to said audio response equipment as said audio file designating information; and said audio response equipment takes out said audio information from said audio file designated by said number of said exhibit and said language, converts said audio information into audible sound signals and transmits said audible sound signals to said portable terminal unit via said speech path.

5. An information guiding system according to claim 1, wherein said audio response equipment stores audio files corresponding to a plurality of degrees of detailedness of explanation of an exhibit (hereinafter referred to as "information depth") for each of said exhibits;

said portable terminal unit supplies the number of an exhibit and a selected information depth to said audio response equipment as said audio file designating information; and said audio response equipment takes out said audio information from said audio file designated by said number of said exhibit and said information depth, converts said audio information into audible sound signals and transmits said audible sound signals to said portable terminal unit via said speech path.

6. An information guiding system according to claim 1, wherein said audio response equipment stores audio files of a plurality of languages for each of said exhibits and a degrees of detailedness of explanation of an exhibit (hereinafter referred to as "information depth");

said portable terminal unit supplies the number of an exhibit, a selected information depth and a selected language to said audio response equipment as said audio file designating information; and said audio response equipment takes out said audio information from said audio file designated by said number of said exhibit, said information depth and said language, converts said audio information into audible sound signals and transmits said audible sound signals to said portable terminal unit via said speech path.

7. An information guiding system according to claim 6, wherein when there is a change in said number of said exhibit, said language or said information depth while said audio information is listened to, said portable terminal unit transmits said number of said exhibit, said language or said information depth which is changed to said audio response equipment via said speech path; and said audio response equipment changes said audio file for taking out said audio information on the basis of the received information, takes out said audio information from the changed audio file, converts said audio information into audible sound signals and transmits said audible sound signals to said portable terminal unit via said speech path.

8. An information guiding system according to claim 2, wherein said portable terminal unit includes a function key which starts calling processing, call setting processing for supplying a service number, processing of receiving said feeble signal, and processing of transmitting said audio file designating information by one-touch operation.

9. An information guiding system according to claim 8, wherein when said function key is operated during the communication between said portable terminal unit and said audio response equipment, said portable terminal unit executes said processing of receiving said feeble signal and said processing of transmitting said audio file designating information and does not execute said calling processing and said call setting processing for supplying a service number.

10. An information guiding system according to claim 1, wherein said portable terminal unit represents said audio file designating information by a combination of numerals, converts each of said numerals into an MF signal and transmits said MF signal to said radio base station; and said radio base station transmits said MF signal to said audio response equipment via said exchange and said speech path.

11. An information guiding system according to claim 1, wherein said portable terminal unit represents said audio file designating information by a combination of numerals and transmits said combination of numerals to said radio base station through a control channel;

said radio base station converts each of said numerals which represent said audio file designating information into MF signal and transmits said MF signal to said audio response equipment via said exchange and said speech path.

12. An information guiding system according to claim 6, wherein said portable terminal unit includes a language designating key, an information depth designating key, a display unit for displaying said number of an exhibit, a selected language and a selected information depth, and a storage portion for storing said selected language and said selected information depth, and said portable terminal unit transmits said information depth and said language which are stored in said storage portion, and an input number of an exhibit to said audio response equipment as said audio file designating information when guiding service is started.

13. An information guiding system comprising:

an audio response equipment for storing a multiplicity of audio files so as to provide information about the exhibits for visitors in a speech sound and taking out the information about an exhibit from an audio file designated by audio file designating information and outputting said information in audible sound signals;

a cordless portable terminal unit which is carried by a visitor;

a radio base station for controlling the connection between a radio circuit for said portable terminal unit and a wire circuit for an exchange; and said exchange for controlling the connection between said radio base station and said audio response equipment;

wherein said portable terminal unit transmits a service number for guiding to said radio base station together with said audio file designating information so as to request said radio base station to set a call to said audio response equipment;

said radio base station transmits the received service number and audio file designating information to said exchange through said wire circuit so as to request said exchange to set a call when said radio base station receives a call setting request from said portable terminal unit;

said exchange sets a speech path to said audio response equipment on the basis of said call setting request, and transmits said audio file designating information to said audio response equipment; and said audio response equipment takes out said audio information with respect to said exhibit from said audio file designated by said audio file designating information, converts said audio information into audible sound signals and transmits said audible sound signals to said speech path so that it is transferred via said exchange and said radio base station to said portable terminal unit which has called said audio response equipment.

14. An information guiding system according to claim 13, wherein said audio response equipment stores audio files of a plurality of languages for each of said exhibits and a degrees of detailedness of explanation of an exhibit (hereinafter referred to as "information depth"); and said portable terminal unit supplies one selected from the group consisting of the number of an exhibit, said number of the exhibit and a selected language, said number of the exhibit and a selected information depth, and said number of the exhibit, said selected language and said selected information depth to said radio base station as said audio file designating information.

* * * * *